United States Patent
Schmidt et al.

(10) Patent No.: US 11,715,155 B2
(45) Date of Patent: Aug. 1, 2023

(54) SECURE MODAL BASED DIGITAL INSTALLMENTS

(71) Applicant: Synchrony Bank, Stamford, CT (US)

(72) Inventors: Jonathan M. Schmidt, Stamford, CT (US); Viveka Vardhan Ravi, Stamford, CT (US); Tushar Divecha, Stamford, CT (US); Jennifer E. Muller, Stamford, CT (US); Taylor Young, Stamford, CT (US); Gregory Schultz, Stamford, CT (US); Seamus Sullivan, Stamford, CT (US); Prakash Kothandapani, Stamford, CT (US)

(73) Assignee: SYNCHRONY BANK, Stamford, CT (US)

( * ) Notice: Subject to any disclaimer, the term of this patent is extended or adjusted under 35 U.S.C. 154(b) by 0 days.

(21) Appl. No.: 17/389,447

(22) Filed: Jul. 30, 2021

(65) Prior Publication Data
US 2022/0036452 A1    Feb. 3, 2022

Related U.S. Application Data

(60) Provisional application No. 63/059,019, filed on Jul. 30, 2020.

(51) Int. Cl.
*G06Q 40/00*    (2023.01)
*G06Q 40/03*    (2023.01)
*G06Q 20/40*    (2012.01)
*G06F 21/62*    (2013.01)
*G06Q 20/38*    (2012.01)
*H04L 9/40*    (2022.01)

(52) U.S. Cl.
CPC ......... *G06Q 40/03* (2023.01); *G06F 21/6245* (2013.01); *G06Q 20/385* (2013.01); *G06Q 20/4016* (2013.01); *G06Q 20/4097* (2013.01); *H04L 63/04* (2013.01)

(58) Field of Classification Search
CPC .............. G06Q 40/025; G06Q 20/385; G06Q 20/4016; G06Q 20/4097; G06F 21/6245; H04L 63/04
See application file for complete search history.

(56) References Cited

U.S. PATENT DOCUMENTS 11,593,510 B1 * 2/2023 Knox .................. G06F 21/6245
2023/0055106 A1 * 2/2023 Kletter ................ H04L 63/1466

* cited by examiner

*Primary Examiner* — Bennett M Sigmond
*Assistant Examiner* — Marla Hudson
(74) *Attorney, Agent, or Firm* — Polsinelli LLP

(57) ABSTRACT

Examples described herein include systems, methods, instructions, and other implementations for data security with integrated installment payment systems. In one example, account security system receives a checkout communication that includes data describing a validated checkout system of a merchant system. A client token is transmitted in response to an authentication that the checkout communication is from the validated checkout system, and an account communication including the client token and secure client information is received from a client device. An installment payment communication associated with the secure transaction is received from a system other than a merchant system involved in the transaction. The secure transaction is then facilitated following receipt of the installment payment communication.

21 Claims, 15 Drawing Sheets

900 

```
┌─────────────────────────────────────────────────────────────────┐
│ RECEIVING, AT AN ACCOUNT SECURITY SYSTEM COMPRISING ONE OR MORE │
│  PROCESSORS, A STATUS INQUIRY ASSOCIATED WITH A SECURE          │
│  TRANSACTION, A MERCHANT SYSTEM, AND A CLIENT DEVICE            │
│                             905                                 │
└─────────────────────────────────────────────────────────────────┘
                              │
                              ▼
┌─────────────────────────────────────────────────────────────────┐
│ PROCESSING THE STATUS INQUIRY TO DETERMINE THAT THE MERCHANT    │
│ SYSTEM ASSOCIATED WITH THE STATUS INQUIRY HAS BEEN PREVIOUSLY   │
│ VALIDATED AND THAT THE STATUS INQUIRY IS FROM THE MERCHANT SYSTEM│
│                             910                                 │
└─────────────────────────────────────────────────────────────────┘
                              │
                              ▼
┌─────────────────────────────────────────────────────────────────┐
│ ACCESSING, IN RESPONSE TO THE DETERMINATION THAT THE MERCHANT   │
│ SYSTEM HAS BEEN PREVIOUSLY VALIDATED, POSTBACK DATA INCLUDING A │
│ TOKENIZED CLIENT ACCOUNT NUMBER ASSOCIATED WITH CLIENT          │
│                         INFORMATION                             │
│                             915                                 │
└─────────────────────────────────────────────────────────────────┘
                              │
                              ▼
┌─────────────────────────────────────────────────────────────────┐
│ TRANSMITTING THE TOKENIZED CLIENT ACCOUNT NUMBER, WHEREIN THE   │
│ TOKENIZED CLIENT ACCOUNT NUMBER FACILITATES PROCESSING THE SECURE│
│  TRANSACTION WITHOUT THE MERCHANT SYSTEM HAVING ACCESS TO THE   │
│                     CLIENT INFORMATION                          │
│                             920                                 │
└─────────────────────────────────────────────────────────────────┘
```

FIGURE 9

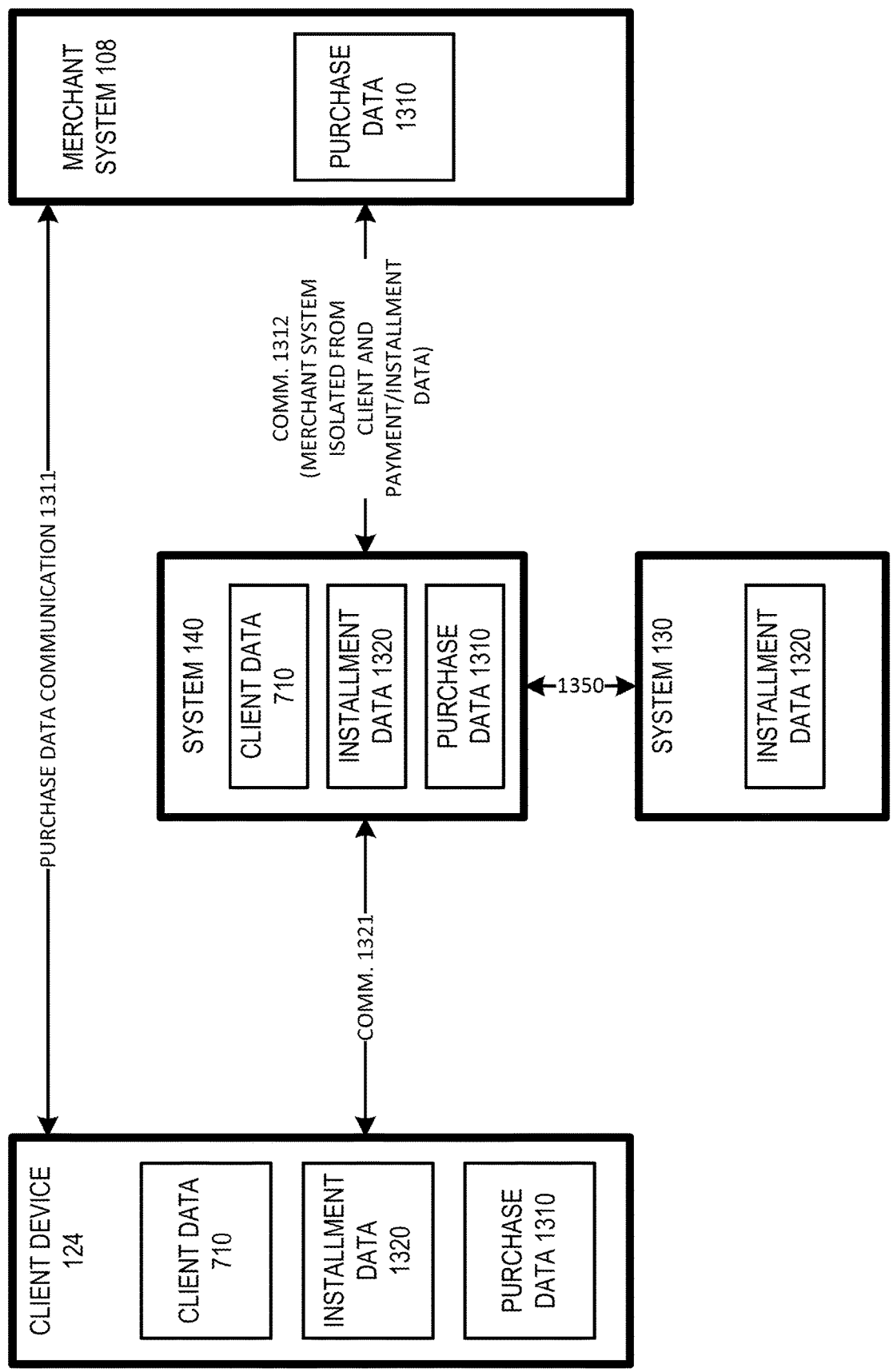

1400

RECEIVING, AT AN ACCOUNT SECURITY SYSTEM INCLUDING ONE OR MORE PROCESSORS, A CHECKOUT COMMUNICATION ASSOCIATED WITH A SECURE TRANSACTION, WHEREIN THE CHECKOUT COMMUNICATION INCLUDES DATA DESCRIBING A VALIDATED MERCHANT SYSTEM
1405

TRANSMITTING A CLIENT TOKEN IN RESPONSE TO AN AUTHENTICATION THAT THE CHECKOUT COMMUNICATION IS FROM THE VALIDATED CHECKOUT SYSTEM, WHEREIN WHEN THE CLIENT TOKEN IS RECEIVED AT A CLIENT DEVICE, THE CLIENT TOKEN IS USED TO VERIFY THE MERCHANT SYSTEM FOR THE SECURE TRANSACTION
1410

RECEIVING AN ACCOUNT COMMUNICATION ASSOCIATED WITH THE SECURE TRANSACTION, THE ACCOUNT COMMUNICATION INCLUDING THE CLIENT TOKEN AND CLIENT INFORMATION, WHEREIN THE CLIENT INFORMATION IS NOT RECEIVED FROM THE MERCHANT SYSTEM
1415

RECEIVING AN INSTALLMENT PAYMENT COMMUNICATION ASSOCIATED WITH THE SECURE TRANSACTION WHEREIN THE INSTALLMENT PAYMENT COMMUNICATION IS NOT RECEIVED FROM THE MERCHANT SYSTEM
1420

FACILITATING THE SECURE TRANSACTION FOLLOWING RECEIPT OF THE INSTALLMENT PAYMENT COMMUNICATION
1425

FIGURE 14

SECURE MODAL BASED DIGITAL INSTALLMENTS

CROSS-REFERENCE TO RELATED APPLICATIONS

The present application claims the benefit of U.S. Provisional Patent Application 63/059,019 filed Jul. 30, 2020, which is incorporated by reference herein in its entirety.

FIELD

The present disclosure relates generally to data security and transactions. In one example, the systems and methods described herein may be used to implement data security in a variety of transactional contexts, and particularly modular integration of data security in transaction websites.

BACKGROUND

Clients often seek to obtain and use credit from a lending institution for a variety of purposes. In some circumstances, a client may interact with a merchant in an environment where the client prefers additional security and protection for the client's data. Managing a transaction in such environments can create barriers to completing transactions between clients, merchants, and lenders. Additionally, other considerations can be involved in such transactions, such as lender and merchant concerns related to fraud, and regulatory controls on data sharing when the data used in such transactions can be subject to a variety of privacy and regulatory considerations. Such considerations can further create barriers in the context of network communications and data management in a communication system for the data used to facilitate credit options and associated purchase transactions.

SUMMARY

Disclosed examples may provide a framework to implement data security for client data used as part of a network transaction, and to manage purchase options (e.g. payment and credit options, including installment options) independently of merchant systems. In some merchant systems, for example, an independent structure for transaction authorization can be implemented, where a merchant may want to also offer secure validation of client accounts and keep sensitive client data (e.g. client account numbers) out of the merchant system, reducing risk associated with a merchant system being compromised. The systems that isolate merchant systems from sensitive client data can also be used to provide installment options to customers independent of merchant systems.

Compared with merchant systems where the merchant system presents payment options associated with credit offers to a customer, integrating options such as particular installment repayment terms for a specific transaction, with an account security system simplifies integration of payment features from card providers by simplifying the changes needed in a merchant system to integrate installment credit options with a security systems. Rather than having a merchant process transaction data and then access installment options based on the transaction data, which can involve not just system resources but also data security and integration barriers, examples described herein can have such operations offloaded from a merchant system to an account security system. Such examples improve the operation of a network by avoiding integration complexity between the merchant system and the account security system, improving data security by reducing communications to a merchant system, and improved network efficiency with options provided from an account security system to a client device. Operation of a client device can also be improved with interfaces providing data directly from an account security system with secure and time efficient data presentation to allow a customer to select options via the account security system.

One example involves an account security system (e.g. a server computer or other machine with memory, processing circuitry, etc.) receiving a checkout communication associated with a secure transaction. The checkout communication includes data describing a validated merchant system. The account security system can then facilitate authentication by transmitting a client token in response to an authentication that the checkout communication is from the validated checkout system of a merchant system. This token can then be used by a client device for transaction security (e.g. to verify the merchant system). The account security system can then receive an account communication including the client token and client information from a client device. Following the account communication, and any further associated communications regarding installment options, an installment payment communication associated with the secure transaction is received. The installment payment communication is not received from the merchant system, and the merchant system is isolated from communications about installment payments and options that occur during the transaction, before completion and final approval of any associated credit and purchase. The client device can present installment options via a secure modal as part of a communication channel with the account security system, and the account security system can use this channel to receive the installment payment communication. As described above, the merchant system is thus involved in authentication so the client device can perform a secure transaction with the merchant using the account security system, while allowing the account security system to handle fetching and selection of installment options associated with the secure transaction. The account security system can then operate with credit issuers to facilitate payment, and work with the merchant to facilitate operations to finalize the secure transaction following receipt of the installment payment communication. As described above, this simplifies integration of the merchant system with an installment system facilitated via the account security system, and improves the operation of the network and devices in the network with additional security, functionality, and efficiency.

In one example, a data security system can be invoked via an interface element included in a merchant user interface. Selection of the interface element can be used as part of a secure transaction to allow a client to perform an account lookup operation or an account validation operation. In some such examples, selection of the associated interface element by a client device interacting with a merchant website causes a checkout communication to be initiated by a merchant system. When the checkout communication is received at an account security system that will facilitate the account lookup or verification as part of the secure transaction, the account security system initially uses the checkout communication to authenticate the merchant system (e.g. confirming that the checkout communication is from a validated checkout system).

The data security system can then generate a client token for the merchant system that can be sent to the client device to confirm that the merchant system has been validated. The client device can then open a modal (e.g. an interface overlay on top of the merchant website interface) that is used for a communication channel with the account security system. This modal allows the merchant website to maintain a consistent look, feel, and interface flow while isolating the merchant system from sensitive client data. The communication channel between the client device and the account security system can be used to transmit identifying client information to the account security system, so that the account security system can provide information for the secure transaction. Account security can include account lookup information, such as providing an account number to a client. Account security can also include account verification, including verifying an account number and providing account details such as an available balance. This account data can then be tokenized to provide security and to isolate the merchant system from the actual data. When the client device is done communicating with the account security system, the tokenized data is then available to be provided to a merchant system if requested by the merchant system for use in completing a secure transaction.

In some examples, a data security system can implement improvements in security, performance, and access to tokenized data to facilitate a secure transaction using a data pull system for tokenized data. In one example, a merchant system can submit a status inquiry when the merchant system receives a notice that a modal and associated communication channel between a client device and an account security system close. The closure can trigger the merchant system to send a status inquiry to the account security system to request postback data including a tokenized client account number. Different examples described herein can perform various operations and communications to access the postback data or communicate system failures that allow a merchant system to respond appropriately. In some examples, this can include resubmitting the request (e.g. when timing errors cause the issue) or to proceed with an alternate system when aspects of the account security system are not available or not functional.

Such examples can be implemented with various methods in an account security system. In some examples, the account security system can perform additional operations including receiving a checkout communication associated with a secure transaction. As described above, an account security system can function where the checkout includes data describing a validated checkout system, and where, when the checkout communication is received from a merchant system, the checkout communication does not include client information. The account security system can then process the checkout communication to authenticate that the checkout communication is from the validated checkout system, and generate a client token in response to an authentication that the checkout communication is from the validated checkout system. The client token can then be transmitted, so that when the client token is received at the client device, the client token is used to verify the merchant system. The account security system then receives an account communication including the client token and client information (e.g. where the client information is not received from the merchant system), and generates a tokenized client account number in response to the account communication. The tokenized client account number is then transmitted for use in facilitating the secure transaction, where the tokenized client account number allows the merchant system to process the secure transaction without access to the client information.

Additional examples or variations can include further security operations to confirm the security of a client device, and to enable interactions with other systems including installment payment systems as part of a secure transaction. The examples described above improve the operation of transaction communications systems, installment systems, and devices in such communication systems by improving device security and security of sensitive data within such devices and systems. Additionally, interfaces described herein improve both the operation of devices displaying such interfaces and communication systems used by such devices by improving the operation flow and reducing the number of user actions to perform operations as part of a secure transaction, as well as by enabling new functionality in system devices. The associated operations can occur in real-time (e.g., occurring immediately or nearly immediately within the context of communications that occur over a fixed amount of time, such as within 1 second) during a transaction to add security to transactions and associated real-time communications. Examples described herein improve the operation of devices and networks with improved security and privacy that can be added to existing devices and networks in real-time secure communication environments.

This summary is not intended to identify key or essential features of the claimed subject matter, nor is it intended to be used in isolation to determine the scope of the claimed subject matter. The subject matter should be understood by reference to appropriate portions of the entire specification of this patent application, any or all drawings, and each claim.

The foregoing, together with other features and examples, will be described in more detail below in the following specification, claims, and accompanying drawings.

BRIEF DESCRIPTION OF THE DRAWINGS

The present disclosure is described in conjunction with the appended figures:

FIG. 9 is a flow diagram illustrating a method in accordance with some examples.

FIG. 13 depicts aspects of a system and system operations for data security and installment payment systems in accordance with some examples.

FIG. 14 is a flow diagram illustrating a method in accordance with some examples.

Figure 1:
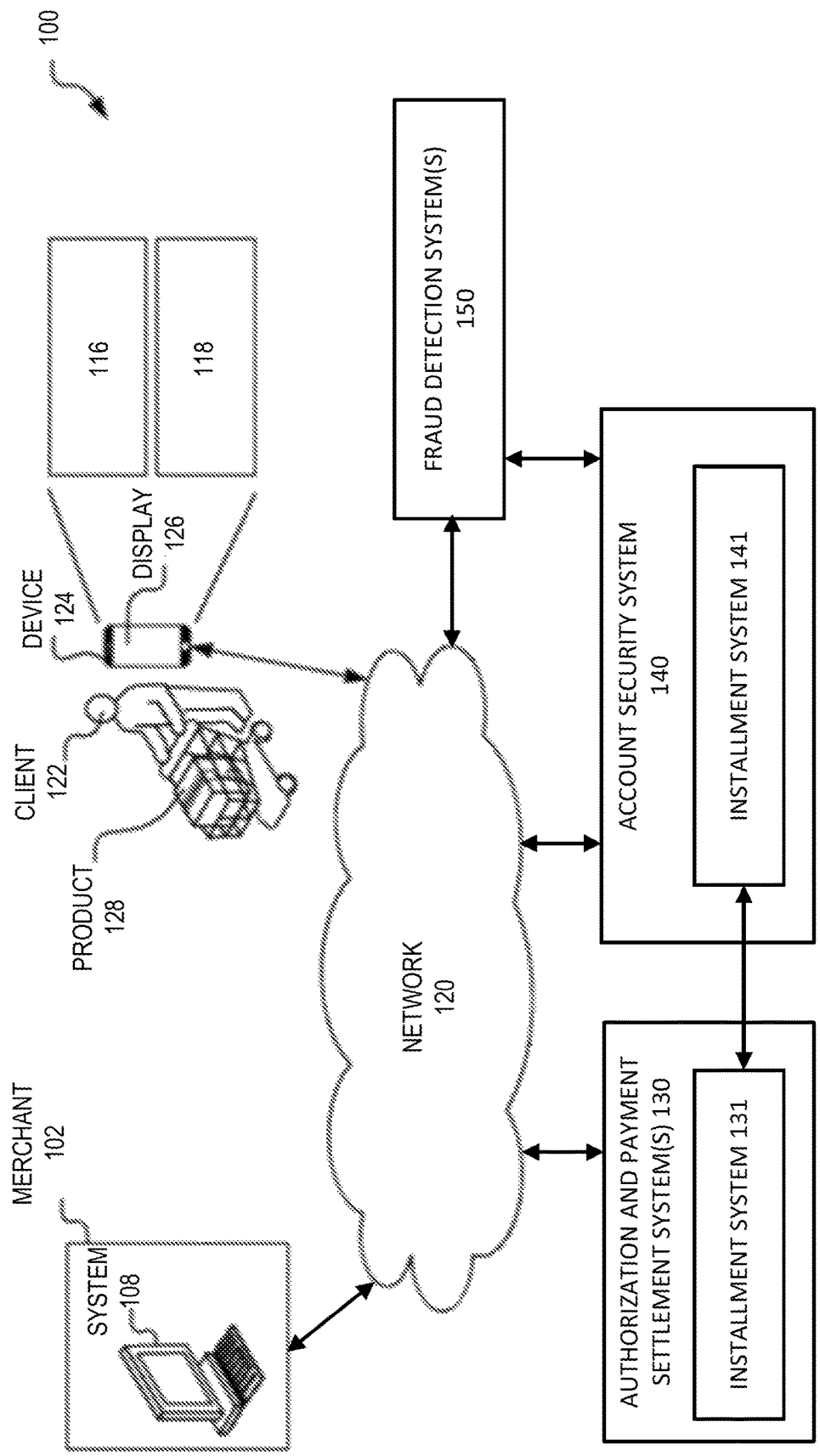
FIG. 1 depicts aspects of a system that can be used for data security in accordance with examples described herein.

In the appended figures, similar components and/or features can have the same reference label. Further, various components of the same type can be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

The ensuing description provides examples of embodiment(s) only and is not intended to limit the scope, applicability or configuration of the disclosure. Rather, the ensuing description of the examples of embodiment(s) will provide those skilled in the art with an enabling description for the described implementations. In the following description, for the purposes of explanation, specific details are set forth in order to provide a thorough understanding of certain inventive embodiments. It is understood that various changes can be made in the function and arrangement of elements without departing from the spirit and scope as set forth in the appended claims. Additionally, it will be apparent that various embodiments may be practiced without these specific details. The figures and description are not intended to be restrictive.

When client facing systems for transactions (e.g. merchant websites) are created, such systems are not always fully integrated with account security features and specific payment option systems. Integration of account security systems and payment systems (e.g. as supported by a particular credit or credit card program that provides credit to customers of a merchant) can be time consuming and complex. Examples described herein involve installment and security systems that can be used for secure transactions involving a merchant system while reducing integration complexity and improving system security and efficiency.

As described herein, examples can allow an account security system to authenticate a merchant system, and allow that authentication to be used with client devices involved in transactions with the merchant systems. The client devices can then communicate directly with an account security system while relying on the authentication managed by the merchant system and account security system. Such client device communications with an account security system can be structured to integrate seamlessly with a merchant website interface. In some examples, a modal interface on a client device is used for such seamless integration.

In one example, an initial model is used to allow a client device to provide secure client information to an account security system, and a second modal is used to allow a client to select installment payment options for repayment terms specific to that transaction. This allows favorable or specific installment repayment terms to be offered in association with a particular transaction, as a feature in a payment network. By isolating a merchant system from the presentation of such installment options to a client and the selection of a particular option, the merchant integration with the is simplified and the security and privacy of a client's sensitive data can be improved. This improves the function of the transaction network as well as the operation of the devices within the network with improved security, functionality, and efficient resource usage.

Some examples described herein can allow a checkout button associated with an account security system to be added to a website. This button allows an interface for account lookup and verification to facilitate custom payment solutions selected by a merchant. The button is provided to client devices as part of a web page user interface from a merchant system. When a client interacting with a merchant website clicks the described modular button, various operations for account security are initiated. The merchant system responds to this selection by communicating with an account security system to authenticate the merchant system. The account security system can then return a client token and postback identifier if the merchant is authenticated. This response information can be used to initiate a modal on the client's device as part of the merchant website user interface. The modal can appear as integrated with the merchant website, but rather than using the existing channel between the client device and the merchant system, the modal uses a separate communication channel between the client device and the account security system. This channel allows the client to provide sensitive client information as part of client verification or account access (e.g. for account lookup or account verification operations). The account security system can then generate tokenized client data for use with the merchant. The tokenized client data keeps the regular client data secure and separate from the merchant system, while allowing the merchant system to perform operations for a secure transaction, so that the merchant can receive payment while only having access to secure (e.g. tokenized) client data that does not put the client's sensitive information at risk.

Certain systems can be implemented without structures for secure client account validation or data security. Some examples described herein include modular features to add user interface elements and underlying systems to enable account number lookup and use in a modular fashion that can be integrated with an existing website. By enabling a tokenized account number as well as additional validation and security features, sensitive client data can be kept secure and never shared with a merchant system. Instead, the merchant system can use tokenized data that keeps the actual client data secure. Additionally, allowing modular integration (e.g. with the addition of a single user interface button that calls a modal or overlay in the website) provides a way to provide account validation without reorganizing existing systems for payment authorization and settlement, thus improving the operation and function of existing devices and device configurations with added data security.

In addition to the operations described above, the initial modal and channel between the client device and the account security system can be initiated, in some examples, only after the client device has been determined to be secure (e.g. using a security analysis of the device). Additionally, other examples can add additional security operations, or can perform different operations for any number of accounts associated with clients, including but not limited to the installment systems described above. In some examples, such installment systems can be implemented with account lookup systems, refund systems, credit offer systems, and other such systems for an account security system. Installment details for a transaction can be automatically generated in real-time or near real-time, and such automatic operations can be performed thousands of times per second or more in accordance with examples described herein. Similarly, data for thousands or tens of thousands of transactions can be stored in a memory or associated database of a device to be available for real-time access during secure transactions as described herein. As such transactions are initiated and facilitated by a system, the sensitive client details stored by the system can be used in real-time or near real-time as part of a transaction to determine the details of an installment offer associated with the transaction. Client responses provided as part of the transaction can then be facilitated using the real-time generated installment offer details.

In some examples, with an account security system that is modular and independent of other operations for a secure transaction, after the account validation is performed and the tokenized client data is generated, the merchant device can interact with separate independent systems to finalize and settle the secure transaction. In various examples, the account security system may communicate with such independent systems to facilitate the use of the tokenized data. Details of selected examples are below, though it will be apparent that additional implementations are possible other than the specific examples provided.

FIG. 1 is a block diagram of a payment communication network 100 in which network data management and security for transactions is implemented with an installment system 141, and installment system 131 separate from the merchant system 108, in accordance with some examples. The example payment communication network 100 includes a merchant 102 implementing a merchant system 108, which can be one or more networked computing devices that can be networked. Merchant system 108 can include any number of devices (e.g. a checkout register, point of sale (POS) devices, or any other such device) as well as server systems and computers that implement a website that can be used to perform secure transactions over a network 120. The merchant system 108 and associated website can be implemented as a computing device with architecture 1500 described below and illustrated in FIG. 15.

Referring to FIG. 1, the merchant system 108 is configured to perform operations associated with a purchase transaction for a client 122 and a product 128. In some examples, a client can use a client device 124 (e.g., a cellular telephone, laptop computer, a desktop computer, etc.) associated with a client account to interact with merchant system 108 as part of a secure transaction. Some examples of a client device 124 can include a display device 126 (e.g., a conventional touch screen) and wireless or wired network connections to network 120. The client device 124 includes software 116 that can additionally cause display of user interfaces 118 on display device 126 in accordance with various examples. This can include, as described herein, web browser software as part of software 116 that can display a user interface using data received from a website of merchant system 108.

A client 122 may select one or more products 128 for purchase via interface(s) of the merchant's website. When the client device 124 interacts with the merchant system 108 via a website interface, the merchant system 108 can use a payment channel based on the particular client device 124 and options selected by client 122.

The merchant system 108 generates and communicates an authorization request message with authorization and payment settlement system(s) 130 as part of a secure transaction. The authorization request message can be routed to an authorization system, with the authorization system 130 processing the authorization request message to generate an authorization response.

An authorization entity can operate one or more authorization computing devices as part of an authorization system 130 configured as part of a payment communication network 100. The authorization system 130 can include various sub-systems or component functions implemented on processors of the authorization system to enable authorization of payment transactions between client 122 and merchant 102. The authorization system 130 can include validation and fraud systems as well as an installment system. These systems can be systems that operate in addition to similar systems of account security system 140 or independent fraud detection system 150. Validation and fraud systems of system 130 can include computing systems for validating card numbers from client device 124 to confirm that credit or payment funds are available to match the purchase amount associated with a transaction being authorized. Additional fraud analysis operations can analyze and process information associated with any aspect of a transaction to approve or deny an authorization request.

In addition to the systems described above, an authorization system can in various implementations, include additional systems for security, fraud detection, and other functionalities. Some implementations can include a token service that can act in a number of ways to facilitate secure communications between client 122 and various other services and devices, including retail merchant system 108 and other systems. Tokenization is a process of substituting sensitive data elements with non-sensitive equivalents (e.g. tokens). The token is a reference identifier that can be mapped to the sensitive data via token service. Such a token service can use large random number in combination with other systems, such as timing systems, to limit and secure the use of sensitive data being communicated over networks such as networks 120.

In examples described herein, account security system 140 is integrated with installment system 141. Installment system 141 can further be integrated with an installment system 131 of system 130. Installment system 141 operates as part of account security system 140 to identify installment payment options available to client(s) 122 during specific transactions. The possible installment options that can be identified can be selected or generated in conjunction with installment system(s) 131 operating on settlement systems 130 that operate with account security system 140. This allows issuer systems such as system 130 to provide options to clients 122 in the secure environment associated with account security system 140 without integration overhead associated with integrating such a feature with merchant system 108.

In some examples, account security system 140 can be the same system as system 130, or can be a tightly integrated set of systems, such as when system 130 is associated with a merchant sponsored or co-branded card with settlement and security systems integrated. As described above, in some examples, authorization system 130 can further be integrated with other systems, such as a credit issuing system and communication channels with a client 122 outside the authorization channels used to communicate authorization request messages and responses between merchant devices and devices of an authorization system (e.g. authorization system 130). In such a system various additional functionality can be integrated for security and payment systems improvements, such as the use of token services as described above. Additionally, while FIG. 1 illustrates communications between various systems and devices, including merchant system 108, client device 124, authorization system 130, account security system 140, fraud detection system 150, and network 120, in additional examples, other aspects of payment communication network 100 can further be altered or include additional or intervening elements, such as multiple clients, clients with shared accounts and devices, additional merchant or retailer systems, subsystems that can operate independently, additional communication channels, or other such structures.

Fraud detection system(s) 150 can include any independent service or system that can be used by account security system 140 or authorization system 130 to supplement or support fraud or security systems. For example, fraud detection system 150 can include systems for detecting if a computer of merchant system 108 or a user device 124 has been compromised by malicious software or other security risks. Fraud detection as described herein can include the use of independent data identifying such issues, as well as communications and analysis operations performed with such devices before they are allowed to participate in secure transactions with account security system 140 and/or authorization system 130. Additional examples can include other such security and fraud detection schemes to support the implementation of secure transactions as described herein. Additional details of an account security system 140 are described below, and in various examples, fraud detection system(s) 150 can be implemented with varying degrees of integration with an account security system 140.

Figure 2:
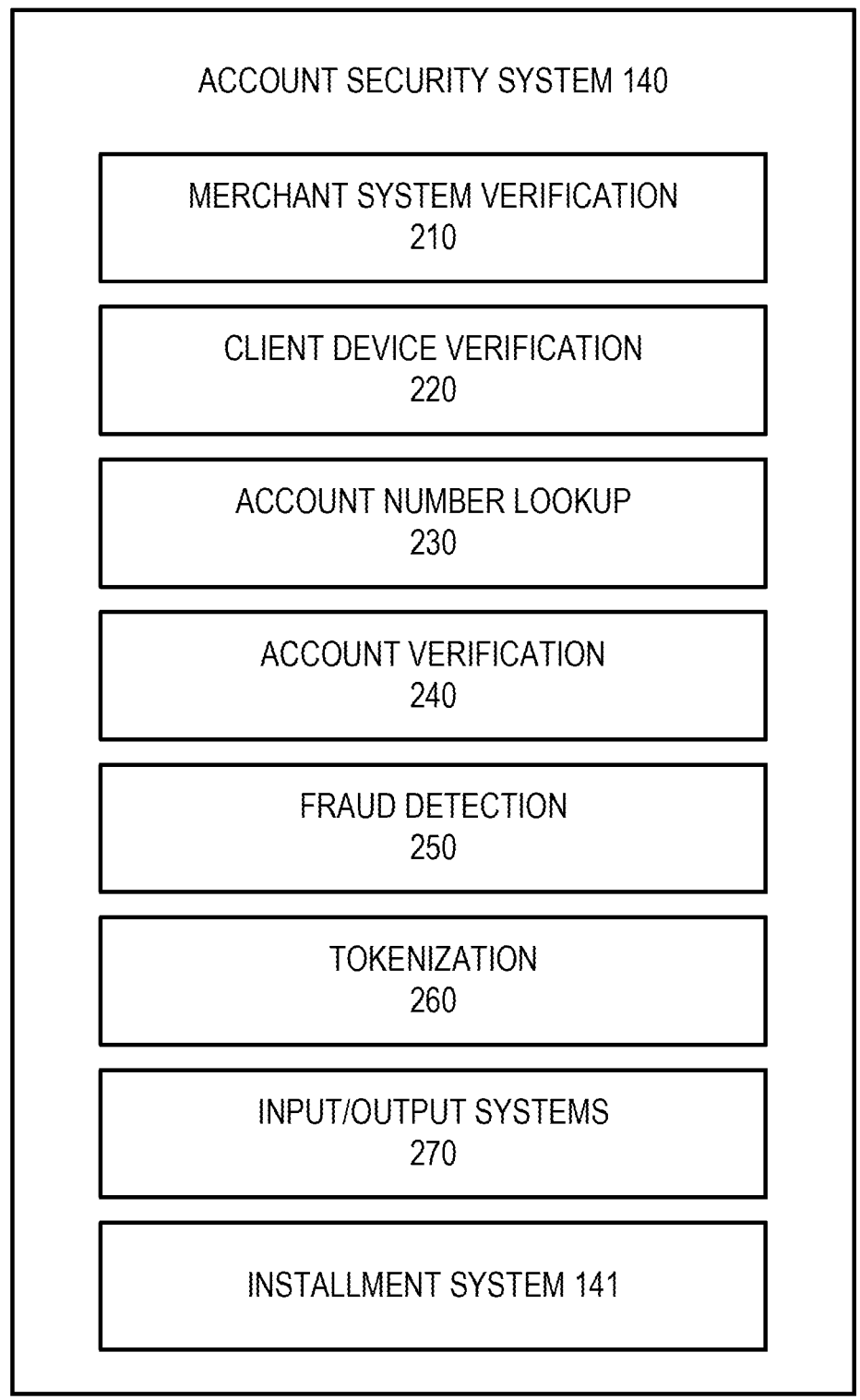
FIG. 2 depicts aspects of an account security system for implementing data security in accordance with some examples.

FIG. 2 depicts aspects of an example account security system 140, which can be used within a payment communication network 100 or other systems to implement data security as described herein. Account security system includes a number of different elements that can be implemented as modules or different devices networked to implement various security functions. Account security system can be implemented as a single server, or as a distributed system using multiple networked devices. Input/output systems 270 can manage transmission of data and receipt of data both between different elements of the system 140 as well as with other devices, such as merchant servers and client devices, using any suitable network and communication components, such as those described below with respect to FIG. 10. The described elements of account security system 140 include merchant system verification 210, client device verification 220, account number lookup 230, account verification, fraud detection 250, and input/output systems 270. In other examples, these elements can be grouped in a variety of different ways. For example, client device verification 220 and fraud detection 250 can, in some examples, be structured as a single sub-system, or can be largely implemented as a separate system (e.g. using separate fraud detection system(s) 150). In various examples described below, the elements of account security system perform different parts of the operations to implement security as part of a secure transaction that uses modular elements to add to the security of larger systems.

Merchant system verification 210 interacts with merchant systems such as merchant system 108 to authenticate that the merchant is safe for a user to perform a transaction with. This verification can be done using security measures such as using security keys, transaction history data, merchant registration, and other verification tools. Merchant system verification 210 can create tokens that can be used as part of a secure transaction to allow participants in the transaction to confirm that they are interacting with verified participants that have met security standards and have access to the token generated by merchant system verification 210 for a specific transaction.

Client device verification 220 can include security operations to check for issues with a client's device, such as malicious software installed on a client device, a history of questionable transactions or fraud associated with a specific device, or other operations. This verification can be implemented via communication with a specific client device, accessing database data with fraud history data, or requiring installation of software on a client device to check for security issues with a client device. In some examples, merchant system verification 210 operations and client device verification 220 operations can be used as gateways for additional sub-systems, such that merchant systems and client devices are not allowed access or use of additional systems such as account number lookup 230 and account verification 240 unless the threshold requirements of merchant system verification 210 and client device verification 220 have been met.

Account number lookup 230 and account verification 240 interact with client devices to receive client data and access sensitive client account information. These operations can, for example, include receiving information such as an address, phone number, government identifier, or other such information, and using this information to access an account number associated with a client credit account. The client credit account number can then be provided to the client device or tokenization 260 element with an authorization to use the credit account with a specific secure transaction (e.g. a transaction associated with a client token generated by merchant system verification 210.) Similarly, account verification 240 can accept a client account number associated with the client credit account, and provide information such as an available balance to allow a client to confirm that the available balance is sufficient for a current secure transaction. The operations of account verification 240 and account number lookup 230 can be associated with a particular transaction, and used to trigger generation of tokenized client data by tokenization 260 element. This tokenization can involve generation of a one-time set of data that can be used only for a specific transaction. In some examples, after the tokenized client data is generated in response to account security system interacting with a client device, the tokenized client data is then stored until it is requested by the merchant system associated with the secure transaction, or until a deletion event occurs. Such deletion events can include a threshold amount of time, a number of incorrect requests for data associated with the client device or the client account, or other such events. If a deletion event occurs, a subsequent request for the data by the verified merchant can be met with a response indicating that the data has expired and the secure transaction is to be restarted (e.g. a new secure transaction initiated and the original transaction abandoned.)

Installment system 141 identifies installment options available in conjunction with settlement system(s) 130 connected with account security system 140. This can include rules associated with when particular installment options are made available to certain clients, accounts, or transactions. Different installment options can, for example, be made available based on a transaction amount, a transaction type, a merchant type, a MID, or a combination of such information or any other such information.

In one implementation, account security system 140 tracks a set data for transactions visible to account security system. The set of installment data can include values for each transaction, such as the industry identifier associated with a particular purchase or transaction. Additional data that can be part of the tracked data can include one or more of a merchant identifier, an account number, a purchase amount, a client identifier, and sets of option data presented to a user for a transaction and a selected option. Other implementations can use other such transaction data. This data can be stored in a secure database at the time of each associated transaction as real-time transaction data. This data can further be supplemented with additional data that is generated after the transaction (e.g. data that is not part of the real-time transaction data). Such data can include return data, fraud data based on subsequent information indicating that a transaction was fraudulent, ties to related purchases that are tied to the particular transaction, customer payment histories for credit purchases associated with the transaction at given times following the transaction (e.g. how the user pays for the purchase in the time periods following a purchase), or other such data that is not real-time with the transaction. Further still, additional processing can be done of such data to generate analytical data, such as customer retention data that can be inferred from a lack of subsequent transaction data combined with other such data, AB preference data based on results from different combinations of options being presented to different users or the same user over time, and other such information derived from analysis of simple observed data. All of this data for many users of account security system, as well as any additional data that can be gathered from outside account security system 140 and aggregated with the data gathered by account security system 140, can be stored in a database accessible by account security system 140.

As described herein, the analysis data described above can be considered sensitive client data and stored securely. This data can, for example, be stored in a secure database that is networked but part of an internal web service that uses security operations similar to those described above to limit data access.

This data described above, including data that is directly gathered from transactions, as well as data that is derived based on subsequent analysis, can then be used for machine learning and artificial intelligence analysis to generate payment options as part of one implementation of secure installment operations. For example, in one implementation, a set of goals can be identified. Such goals can include a target user retention rate, an increased account usage rate, a target option acceptance rate, or other such targets that are related to installment options in a system. One or more combinations of input data selected from the data available in account security system can then be processed to select options associated with the set of system goals. In one implementation, the combinations of data can be processed using a convolutional neural network trained using history data to select a set of options for a client device in a particular transaction as part of account security system 140 communications. Training such a neural network can involve identifying a set of outputs associated with the set of option goals, structuring the network around the historical transaction data associated with the goals to train the neural network, and then implementing the neural network in account security system 140. When data is received for a particular transaction, it can be combined with any additional available information on the account and merchant involved in the transaction, and this data can be processed by the neural network to output probabilities associated with particular options resulting in one or more of the option goals.

In another implementation, other types of classification analysis can be performed on the data available in account security system 140 to classify one or more options or sets of options in association with the option goals. This can, for example, be performed with Bayesian classification to identify particular types of data sets (e.g. sets of merchant identifier values, purchase amount values, location values, etc.) that can be grouped based on a history data association with result data that matches option goals. When data for a real-time transaction is received and account security system 140, a classification analysis of the data for the current real-time transaction can be performed, and based on the identified class, a set of options associated with the identified class can be selected to be returned to client device 124 for presentation to a user.

Once the installment options available for a particular transaction are identified, then communications are initiated by the account security system 140 to present this information to a client on client device 124 in secure modal as described below. This includes at least a second modal in addition to the first modal involved in communications between client device 124 and account security system 140. Depending on user inputs at client device 124, back and forth communications to select a particular option to be applied to a secure transaction can occur.

In some such systems, real-time transaction data can be used with options to perform AB testing to both select a set of option data to present on client device 124 as well as to create history data with the intent of identifying certain classes or sets of data to improve future transactions and installment option selection. For example, in one implementation, a set of classifications can be identified from history data, but the set of options for a particular classification can have multiple different combinations that achieve different but desired expected results associated with option goals. In such a system, secure installment operations 1208 can select from among the different combinations of options, and identify the particular set of options provided to a client device 124. As the different option groups are provided to different users, and subsequent result data is received by the system, this subsequent result data can be used to further refine the options provided to client devices in future transactions.

For example, in a first transaction, secure option operations 1208 can identify three different combinations of options that correlate positively to option goals for the data received for a secure transaction. One option can be a six month installment period at a first interest rate. A second option can be a twelve month installment period at a second interest rate. A third option can be a third interest rate for six month period with no set installment plan. The account security system 140 can select one of the option sets randomly, or based on additional criteria. As this process is repeated for many transactions (e.g. thousands, tens of thousands, or millions of transactions), the account security system 140 can track the actual results for the three different combinations. The results can identify how often a user presented with an option actually selects the option, how often a user meets the repayment terms of options with installment criteria, how often a user that selects an installment option uses the credit account for other purchases, or any change in use frequency after the user selects one of the presented options, or other such results. These results can be used to select one of the combinations for future use, or to further generate subcategories of transactions where different combinations of options can be presented.

Throughout operations for data security described herein, fraud detection 250 can monitor data and generate alerts or halt operations for a specific transaction when a risk of fraud is identified.

Figure 3:
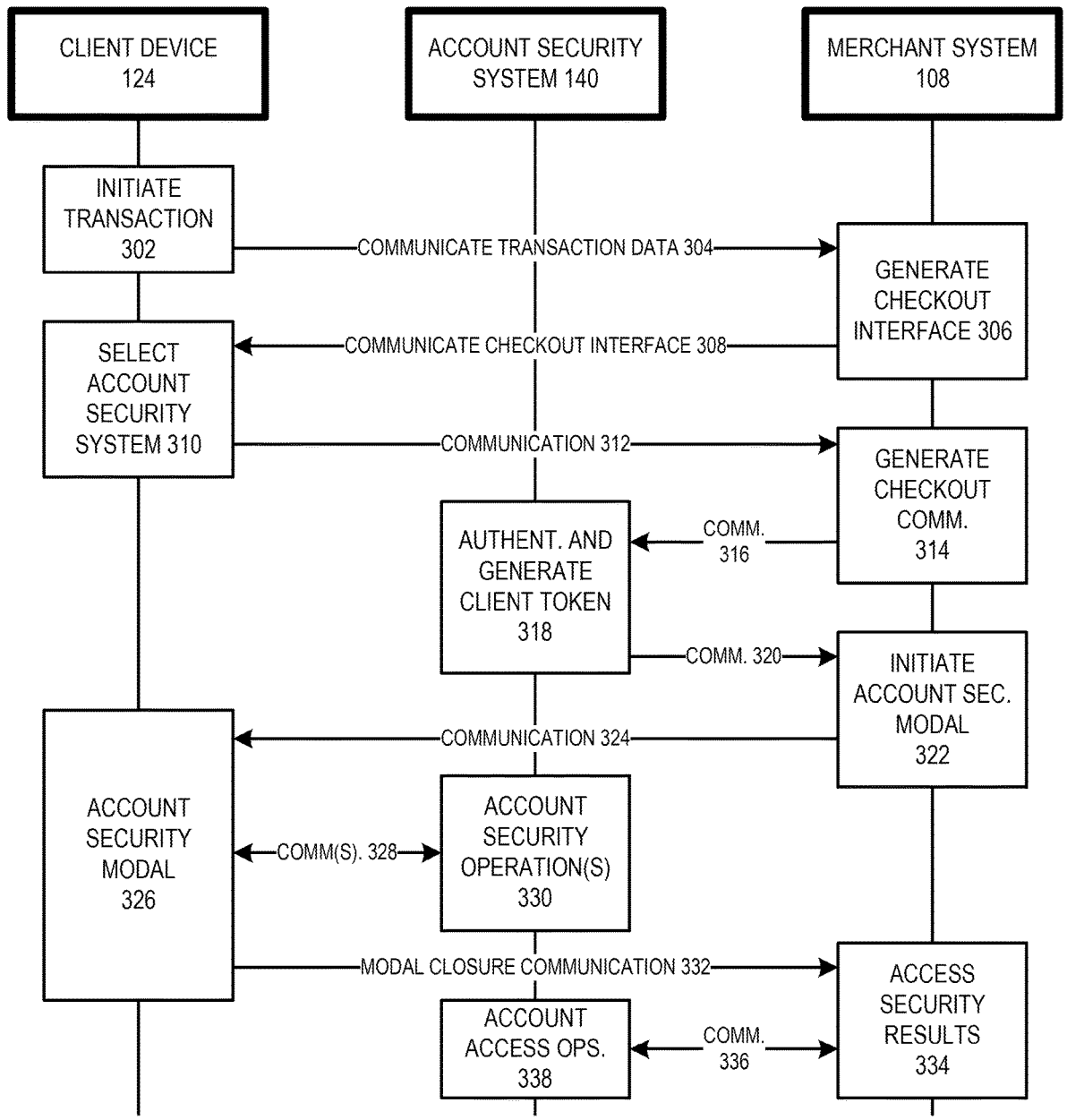
FIG. 3 depicts aspects of a system and system operations for data security in accordance with some examples.
Figure 4:
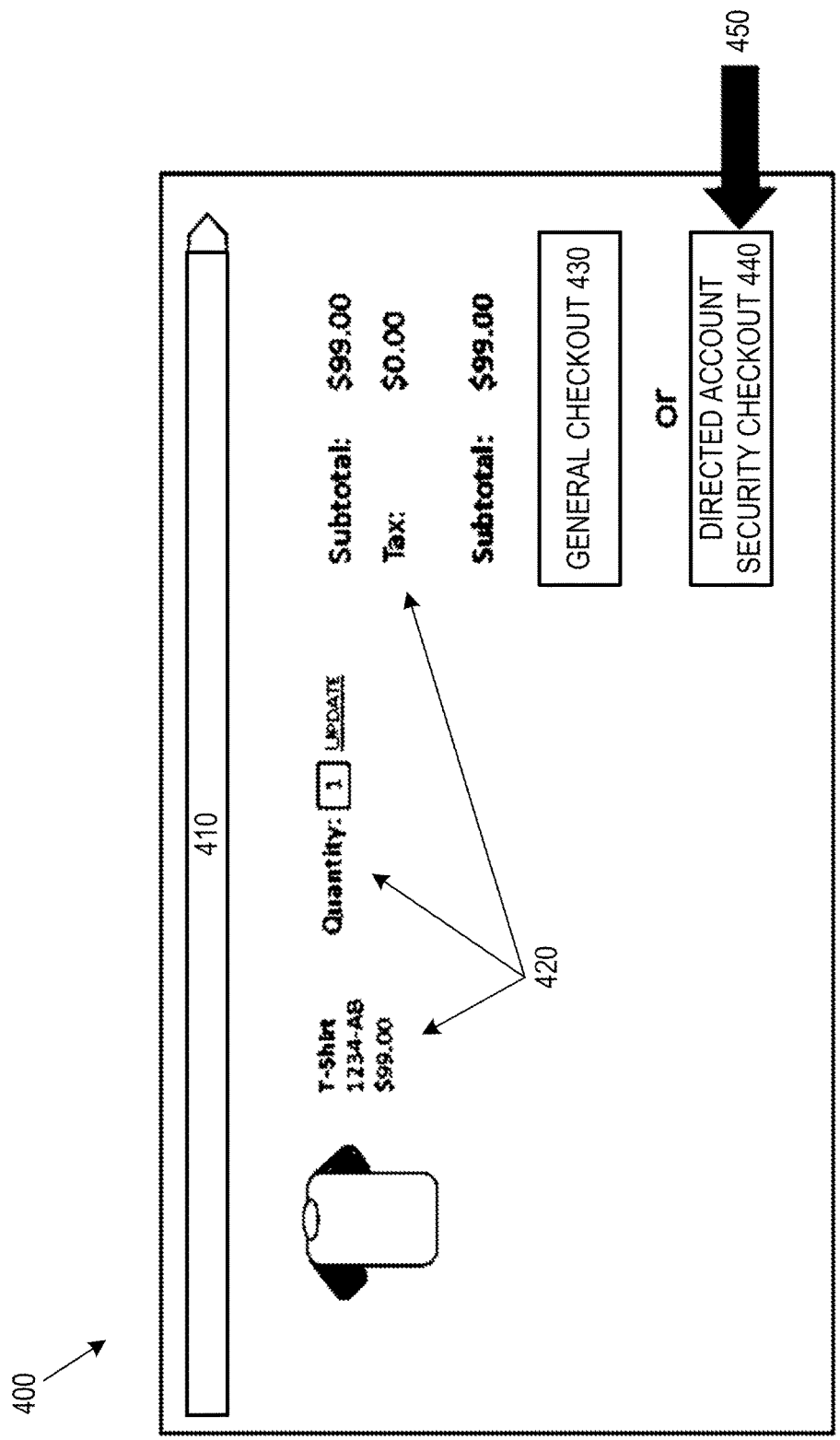
FIG. 4 depicts aspects of a system and user interfaces for data security in accordance with some examples.
Figure 5:
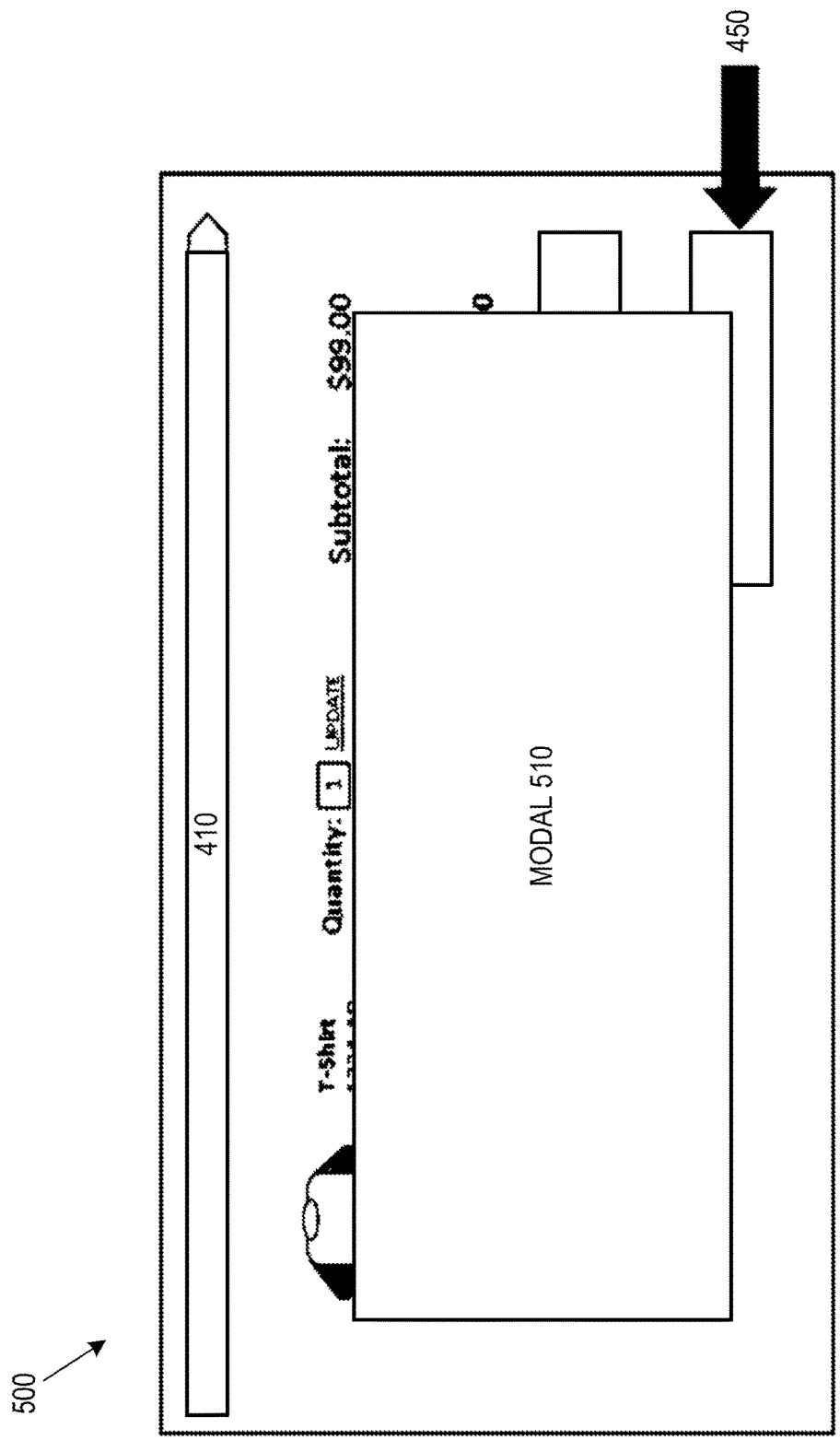
FIG. 5 depicts aspects of a system and user interfaces for data security in accordance with some examples.

FIGS. 3-5 then describe an implementation of a secure transaction with data securing and a modular website implementation in accordance with some examples. FIGS. 4 and 5 illustrate aspects a modular website with an interface that can be displayed on a client device (e.g. client device 124) as part of data security operations for aspects of a secure transaction illustrated by FIG. 3.

FIG. 4 illustrates a user interface 400 with a transaction flow indicator 410, and product data 420 for a product (e.g. product 128) that has been selected for purchase using a merchant website (e.g. as part of merchant system 108 of merchant 102). The user interface 400 includes a general checkout 430 interface element that can initiate payment operations using a general settlement system, or can used directed account security checkout 440 element. The directed account security checkout 440 interface element is a modular interface element that can be added to a website of a merchant in order to initiate data securing operations via an account security system in accordance with examples described herein. When a selection 450 of directed account security checkout 440 element occurs, a modal is launched to initiate a communication channel with an account security system (e.g. account security system 140), as illustrated by FIG. 5.

FIG. 5 shows a user interface 500 with modal 510 overlaying user interface 400. User interface 400 can be communicated to a client device from a merchant system, with various interactions with a merchant website leading to interface 400 being displayed on a screen of the user device. When selection 450 initiates modal 510, the modal 510 does not communicate via a merchant system, but establishes a communication channel with an account security system to keep sensitive client data separate from the merchant system. The modal 510 can then accept sensitive client data such as phone numbers, addresses, client identifiers, account numbers, and other such information. This information is kept separate from the merchant system, while the modal 510 allows modular integration of this independent data security structure (e.g. communications with data security system) within the context and user interface flow of the merchant website. Additional aspects of such interfaces are described below in the context of the examples shown in FIGS. 3 and 6.

FIG. 3 illustrates system operations and communications for data security as part of a secure transaction involving client device 124, account security system 140, and merchant system 108. In operation 302, client device selects products for purchase as part of a secure transaction, and initiates the secure transaction (e.g. via a process to checkout selection of a user interface). Communication 304 informs merchant system 108 of the client device 124 selection, and in response, merchant system generates a checkout interface (e.g. interface 400) in operation 306. The checkout interface includes a modular button, such as directed account security checkout 440 element of FIG. 4, and the data for the user interface is communicated from merchant system 108 to client device 124 in communication 308. In operation 310, the client device receives a selection for the account security system (e.g. selection 450), and this selection is communicated to merchant system 108 in communication 312.

The merchant system 108 receives an indication of the selection for the account security system in operation 314, and generates a checkout communication in operation 314, that is sent to account security system 140 in communication 316. In response to the checkout communication, account security system operation 318 authenticates merchant system 108 to confirm that the merchant system is secure and has been validated. The account security system generates a client token when the authentication is confirmed, and communicates the client token to merchant system 108 in communication 320. In some examples, the client token can be communicated with a postback identifier to allow tracking of the communications for the secure transaction, and to allow management of different transactions with different client devices and merchant systems that can continuously be interacting with account security system 140 to provide data security for secure transactions.

Merchant system 108 uses the client token from account security system to initiate the account security modal in operation 322 with communication 324, which can include the use of the client token in communication 324 that, when received by client device 124, allows the client device to perform security measures to confirm that merchant system 108 is a secure system and can safely perform the secure transaction. In operation 326, client device 124 opens a modal (e.g. modal 510 of user interface 500. From a client perspective, the modal opens in response to a user interface selection (e.g. selection 450), and appears as part of an interface for the merchant system 108 website. As described above, the modal opened in operation 326 is used with a communication channel established between client device 124 and account security system 140 for communications 328. Communications 328 for operations 326 and 330 can operate for various security operations, which can include operations to confirm that client device 124 is not presenting indications of a virus or security compromises, and can also include other fraud detection operations. Once such security operations are used as a gate to account access, the client device 124 can further provide sensitive client data to account security system 140 to perform operations in a secure environment as part of operations 326 and 330, including account number lookup and account verification operations. During the account security system 140 portion of these functions in operations 330, tokenized client data can be generated in response to data and interface selections provided via the modal on client device 124. The tokenized client data can be stored at account security system 140 until requested by the merchant system in operations 334.

Processing of communications as part of a secure transaction and associated generation of the tokens and additional communications to facilitate modal presentation can occur in real-time or near real-time (e.g., limited by processing and network speeds and latency), such that computing devices facilitating communications and security operations automatically perform operations and provide information within a transaction that occurs within a brief time period (e.g., less than 0.1 seconds in some environments, less than 1 second in some environments, or less than 3 seconds in some environments). The near real-time operations and communications allows an account security system 140 to operate between a parent merchant system 107 and a client device 124 while minimally degrading the near real-time nature of communications for a transaction between client device 124 and parent merchant system 107, and improving device and system operation with added privacy and security. Further, in some implementations of real-time automatic operation, multiple instances of operations described above can occur simultaneously. For example, operation 306 for one transaction can occur simultaneously with any or every other operation of FIG. 3 for other transactions.

Similarly, a single device implementing an account security system 140 can automatically perform multiple instances of each of operations 318, 330, and 338 for different transactions at the same time. Similarly, associated, validation or authentication operations can be dynamically performed in real-time to improve the security of the system while maintaining quality of service (e.g., overall system responsiveness to client device 124 communications). An account security system 140 can perform automatic and real-time processing operation 910 as well as operations 915 and 920 below for many customers simultaneously (e.g., thousands of checkout communications per minute, thousands of checkout communications per second, or more depending on system configurations).

The modal of operations 326 can, in some examples, close without the client device providing adequate information for the client to access account data or for tokenized client data to be generated. In such a circumstance, the client device can proceed with the transaction using a separate system (e.g. returning to interface 400 and selecting the general checkout 430 user interface element). Data associated with this failure can be logged and used to check against future fraud indications.

When the modal does provide sufficient client data to account security system 140, closure of the modal on client device 124 can be considered the end of operations 326, and this closure can be communicated to merchant system 108 in communication 332. The closure causes merchant system 108 to request the security results from account security system in operation 334 using communications 336, which result in account security system responding with the tokenized client data in operations 338 and responsive communications 336.

Figure 6:
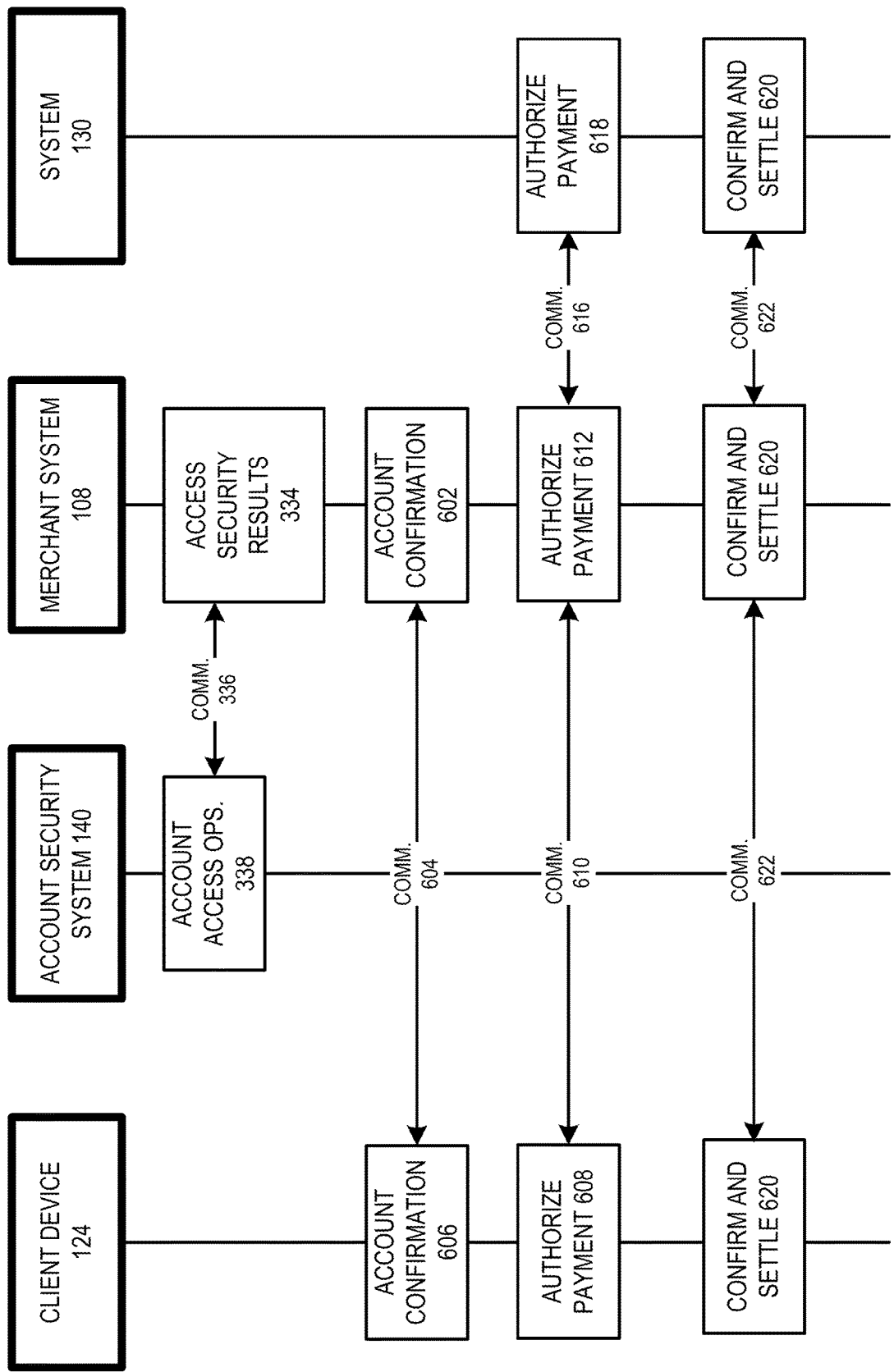
FIG. 6 depicts aspects of a system and system operations for data security in accordance with some examples.

In some examples, upon providing the tokenized client data, the independent modular data security operations provided by account security system 140 can be considered complete. Remaining payment and settlement operations can then be performed with a separate settlement system 130, as illustrated by FIG. 6. As described above, tokenized client data can be automatically generated in real-time or near real-time, and such automatic operations can be performed thousands of times per second or more in accordance with examples described herein. Similarly, data for thousands or tens of thousands of transactions can be stored in a memory or associated database of a device to be available for real-time access during secure transactions as described herein.

Further, in various implementations, any other communications and operations of FIG. 3 can be performed in real-time or near real time. For example, communications between client device 124, account security system 140, and parent merchant system 107 (or any other merchant system) can occur in real-time or near real-time (e.g., as limited by processing speeds and latency in the devices and network) to provide a seamless user interface presentation as part of a transaction with merchant system 108. Additionally such communications and operations for a given transaction can occur simultaneously with communications and operations for other transactions, such that simultaneous real-time operations can be performed by a device or system for many transactions.

FIG. 6 includes not only client device 124, merchant system 108, and account security system 140, but also includes authorization and payment settlement system 130. As illustrated in FIG. 6, the tokenized client data stored in account security system 140 after successful account access in operations 326 and 330 can then be accessed by merchant system 108 in operations 334 and 338.

In operations 602 and 606 with communications 604, the client device can confirm the use of the account associated with the tokenized client data for payment as part of the secure transaction, and in operations 608, 612, and 618. The client device 124 selects an interface to initiate payment with communication 610, and merchant system 108 then interacts system 130 for payment authorization in operations 612 and 618 with communication(s) 616. When payment is authorized, the system 130, merchant system 108, and client device 124 can then later proceed with settlement operations 620 using communications 622, including payments to the merchant, and client payment or reconciliation of any credit payment or account balance data between the client and the settlement system, without further involvement of account security system 140.

Figure 7:
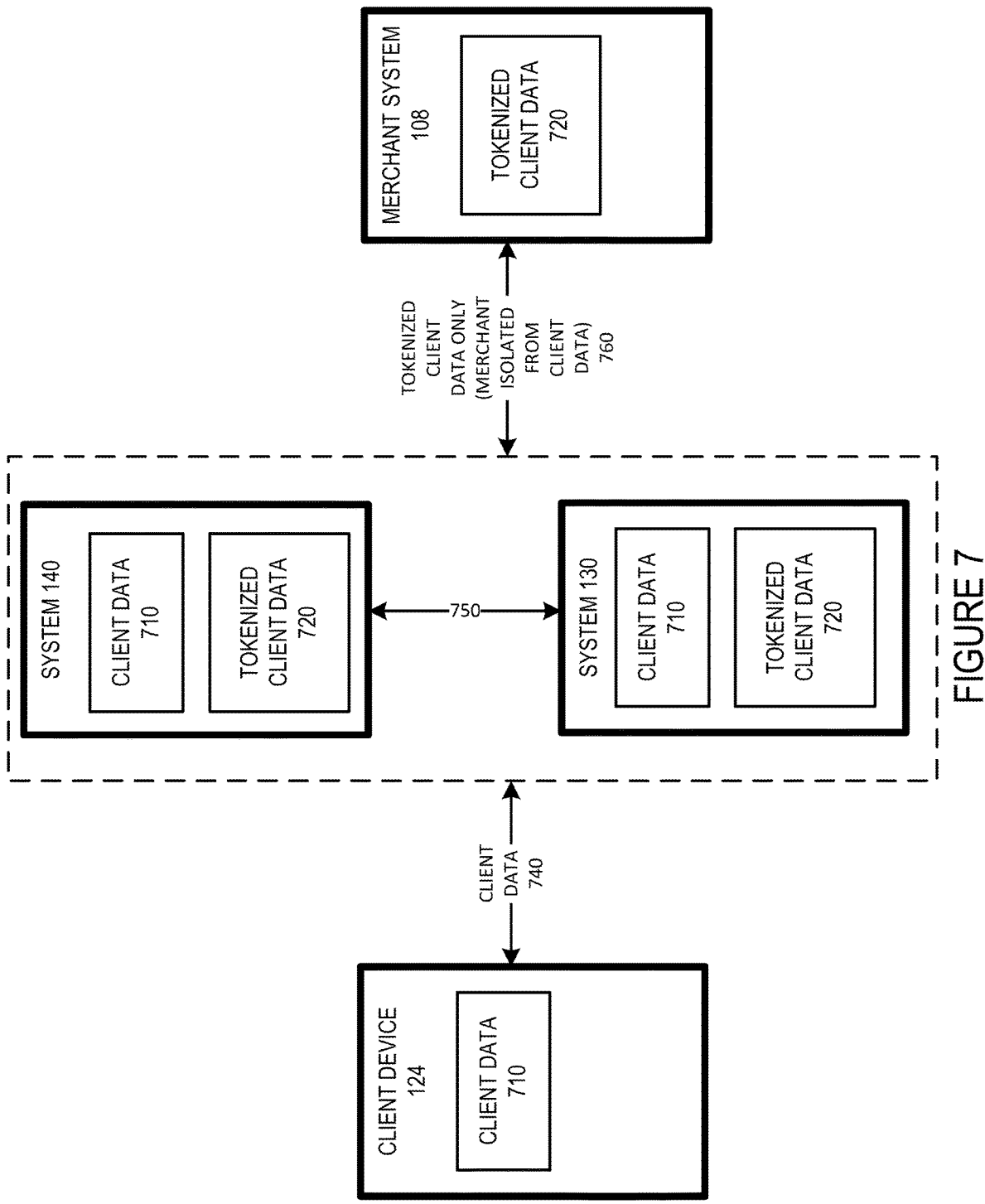
FIG. 7 depicts aspects of a system and system operations for data security in accordance with some examples.

FIG. 7 further illustrates aspects of data security in example systems, particularly showing how sensitive client data is isolated from merchant systems. As illustrated, client device 124 can include client data 710 provided by a client or user of the client device 124. In the secure transaction illustrated above and in additional examples, communication of client data in communications 740 occurs with account security system 140 and may occur with authorization and payment settlement system 130, so that systems 130 and 140 can both have access to sensitive client data 710. The merchant system 108, however, is isolated from this client data 710, so that merchant system 108 only receives tokenized client data 720 in communication(s) 760. This tokenized data received by merchant system 108 is secure, so that the tokenized data does not allow merchant system 108 access to or sensitive information associated with the client data used to generate the tokenized data. As described above, the tokenized client data 720 is generated in system 140, and is generated to obscure the actual client data, while allowing the merchant system to interact with systems 130 and 140 to facilitate payment. Various data can be shared with an authorization and payment settlement system 130 in communications 750 to allow the use of the tokenized client data in authorizing payments for the secure transaction. In other examples, communications 750 do not include specific tokenized client data, but other data can be shared that facilitates system 130 accepting the tokenized client data 720 from merchant system 108 as part of a secure transaction.

The use of account security system 140 in addition to authorization and payment settlement system 130 provides benefits to a system in which merchant system 108 and system 130 have fixed structures or implementations that would require significant resources or changes to implement the account lookup and account verification features between merchant system 108 and system 130. The use of account security system 140 enables such functionality with minor modular user interface changes by merchant system 108 website implementations, so that the security of the system 130 and merchant system 108 communications is improved without these systems needing to be replaced.

Figure 8:
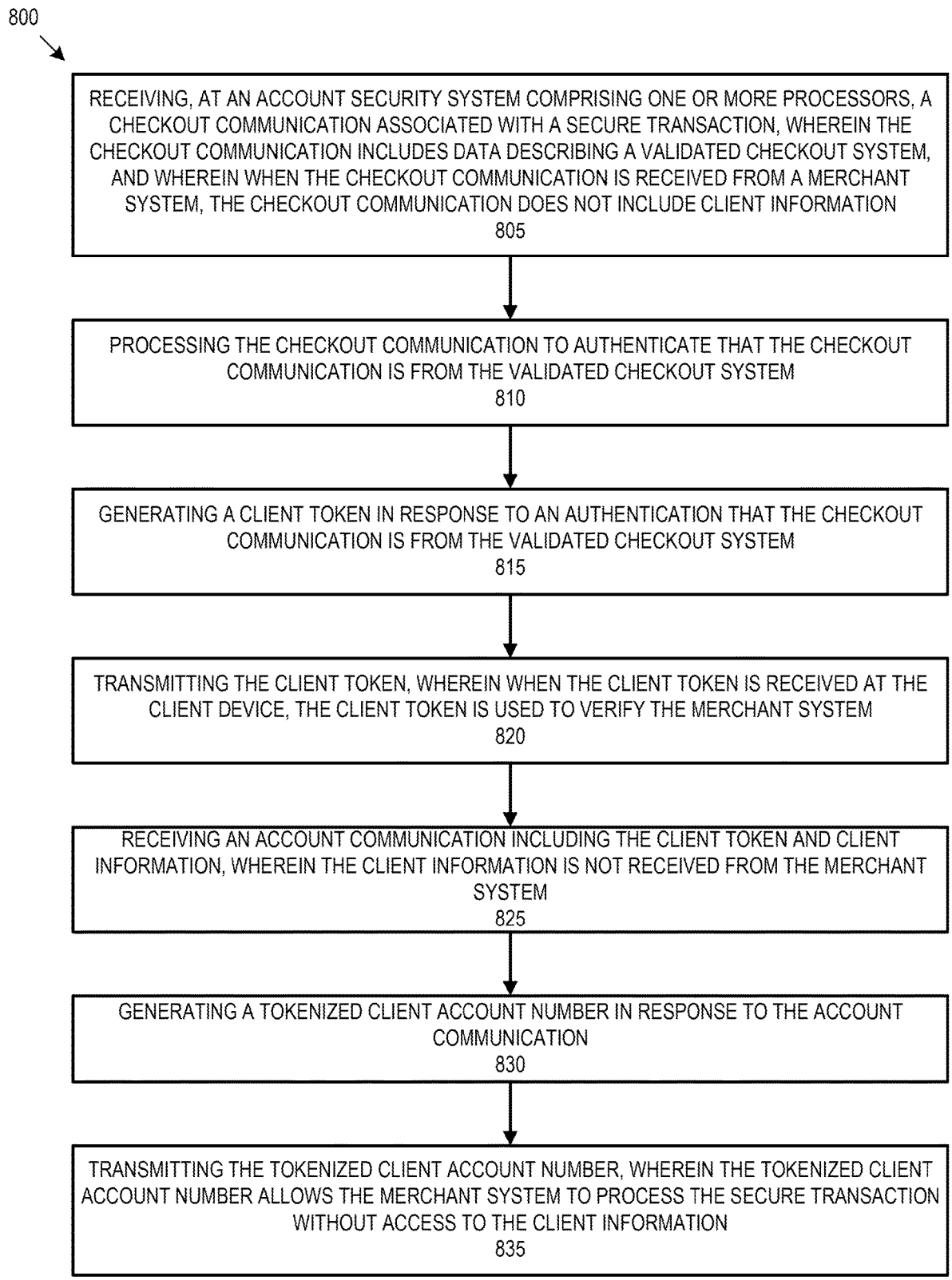
FIG. 8 is a flow diagram illustrating a method in accordance with some examples.

FIG. 8 is a flow diagram illustrating an example method 800. Method 800 can be performed by one or more processors of a server computer or server system as part of an account security system (e.g. account security system 140). Method 800 can, in some examples, be implemented as computer readable instructions that, when executed by processing circuitry of a device, cause the device to perform steps of method 800.

Method 800 includes operation 805 to receive, at an account security system comprising one or more processors, a checkout communication associated with a secure transaction. In some examples, this checkout communication can be received from a merchant system, either directly through a wide area network (e.g. the Internet), or via additional systems. In some examples, the checkout communication includes data describing a validated checkout system (e.g. the merchant system) sufficient to allow the account security system to analyze the security of the merchant system. In some examples, when the checkout communication is received from a merchant system, the checkout communication does not include client information, as the merchant system is isolated from sensitive client information.

In operation 810, the checkout communication is processed to authenticate that the checkout communication is from the validated checkout system (e.g. the merchant system). This authentication can include operations performed directly at an account security device, as well as additional communications with the merchant system or independent third party systems and devices (e.g. as part of fraud detection system(s) 150).

Method 800 then includes operation 815 where a client token is generated in response to an authentication that the checkout communication is from the validated checkout system. In some examples, the client token is generated with a postback identifier. The postback identifier can be used by the merchant system and the account security system to track a status of a particular secure transaction, and to associated data and specific communications with the particular secure transaction.

In operation 820, the account security system transmits the client token. The client token can be communicated to a client device via merchant system, so that when the client token is received at the client device, the client token is used to verify the merchant system.

In operation 825, an account communication is received that is associated with the client token and includes client information. The account communication can be received directly from the client device, and can include the client token as received at the client device from the merchant system. As described above, since the client information is kept isolated from the merchant system, the client information is not received from the merchant system. In some examples, the account communication includes an account lookup request without an account number associated with the tokenized client account number. This communication can allow a client who does not have access to an account number to securely access the account number via the account security system to use an account with the secure transaction. In other examples, the account communication includes an account verification request and an account number associated with the tokenized client account number. This communication can also allow a client to access additional account information, such as an available balance, in a secure fashion, and to authenticate the account, as part of use of the account for the secure transaction.

In some examples, the client information is processed to confirm that the account communication is from a secure client device. In other examples, additional communications and operations are performed to confirm that the client device is not compromised by malicious software, and there is no history of the client device being involved in fraudulent transactions. This confirmation can be done using various security database data and fraud detection tools as described herein.

Some such examples can operate with the account security system opening a secure channel with a client device so that the account communication is received from the client device via a modal on the client device generated as part of the secure channel. The account security system can then generate and store the tokenized account number so that when a request is received for the tokenized client account number from a merchant device in response to closure of the modal on the client device, and the tokenized client account number is transmitted to the merchant device in response to the request. Some such examples can operate where the checkout communication is received as using a secured post channel, where the client token is transmitted to the merchant device with a postback identifier using the secured post channel, and where the modal is opened on the client device and the secure channel is established between the account security system and the client device in response to the client token as communicated to the client device from the merchant device.

Method 800 then includes operation 830 where a tokenized client account number is generated in response to the account communication. The tokenized client account number can included embedded information about a client or client account in such a way that tokenized client data is included as part of the tokenized client account number, but the client data is secure and not available to the merchant system, as the tokenization obscures the details of the client data from the merchant system. The merchant system, however, can provide this information to a separate payment authorization and/or settlement system, which is able to use this tokenized client data to facilitate the secure transaction.

The tokenized data is transmitted in operation 835, so that the tokenized client account number allows the merchant system to process the secure transaction without access to the client information. As described above, the merchant system can, in some examples, then authorize payment with a separate system independent of the account security system as part of the secure transaction. Similarly, in some such examples, the account security system can perform operations for facilitating the secure transaction by sharing (e.g. transmitting) the tokenized client account number with the separate system to allow the merchant system to settle payment for the secure transaction with the separate system without the merchant system having access to the client information.

The above method describes particular operations as part of an example. Other examples can including similar operations with repeated operations or intervening operations. Additionally, it will be apparent that similar operations can be performed as part of example methods in accordance with the described modular website integration for data security.

FIG. 9 is a flow diagram illustrating an example method 900. Method 900 can be performed by one or more processors of a server computer or server system as part of an account security system (e.g. account security system 140). Method 900 can, in some examples, be implemented as computer readable instructions that, when executed by processing circuitry of a device, cause the device to perform steps of method 900. Method 900 can, in some examples, be implemented in the context of method 800 (e.g. as additional operations to provide security prior to transmission of a tokenized client account number in response to a request for the tokenized client account number in a status query from a merchant system).

Method 900 includes operation 905 to receive, at an account security system with one or more processors, a status inquiry associated with a secure transaction and with a merchant system and a client device involved in the secure transaction. This status inquiry can include identifying codes or passwords associated with parties to the transaction, and can also include information identifying the secure transaction (e.g. a client token previously generated by the account security system).

Operation 910 of method 900 then involves the processors processing the status inquiry to determine that the merchant system associated with the status inquiry has been previously validated and that the status inquiry is from the merchant system. In some examples, this status inquiry processing can include accessing an independent system to process data from the status inquiry. In other embodiments, the analysis of status inquiry data can be performed within the account security system. In some examples, additional security operations can be performed with this authentication, such as operations for a status inquiry to confirm that the status inquiry includes a valid input, operations to confirm that a client device is not compromised, or other such security operations.

Then, in response to the determination that the merchant system has been previously validated, operation 915 of method 900 involves accessing postback data including a tokenized client account number associated with client information. As described above, this postback data can be generated by the account security system using data from a modal presented on a client device as part of a merchant system website. Generating the tokenized client account number this way allows the merchant system to be isolated from the sensitive client information used to generate the tokenized client account number. Similarly, the operations of method 900 allow the merchant system to pull the tokenized client account number from the account security system without the merchant system having access to secure client data. Instead, the merchant system can use tokens or other data for a specific secure transaction to pull the tokenized data.

The in operation 920, the tokenized client account number is transmitted. The merchant system can then use the tokenized client account number to facilitate processing the secure transaction without the merchant system having access to the client information.

In various implementations, such a method can operate by further generating a client token for the secure transaction in response to a checkout communication and storing the client token in a database with initial postback data including the client token for the secure transaction. Such operations can be used to track a secure transaction status, and to match tokenized data to a transaction.

As described above, some such examples can operate in a system that also supports pushing tokenized client data. In one such example, a second account communication associated with a second secure transaction and a second merchant system can be received, with the second account communication including a second client token and the client information, and where the client information is not received from the second merchant system. Such an example can then include operations for generating a second tokenized client account number in response to the second account communication and transmitting the second tokenized client account number with second postback data to a uniform resource locator address associated with the second merchant system.

As part of any transaction with an account security system described herein, the tokenized client data can be using a secure channel with the client device where the client information is received from the client device via a modal on the client device generated as part of the secure channel. The status inquiry can then be generated by the merchant system in response to closure of the modal on the client device, where the tokenized client account number is generated using the client information, and where the tokenized client account number is transmitted to the merchant system in response to the status inquiry.

When the tokenized client data is successfully provided to a merchant system, the secure transaction can be facilitated by sharing the tokenized client account number with a separate system to allow the merchant system to settle payment for the secure transaction with the separate system without the merchant system having access to the client information.

These operations can, in various examples, be integrated with other operations for account security and operation of an account security system as described herein. In some examples, such operations can be repeated, can include intervening operations, or can be performed concurrently for any number of secure transactions between different merchant systems and client devices. It will therefore be apparent that while method 900 describes one example implementation, other implementations are also possible in accordance with the details provided herein.

Figure 10:
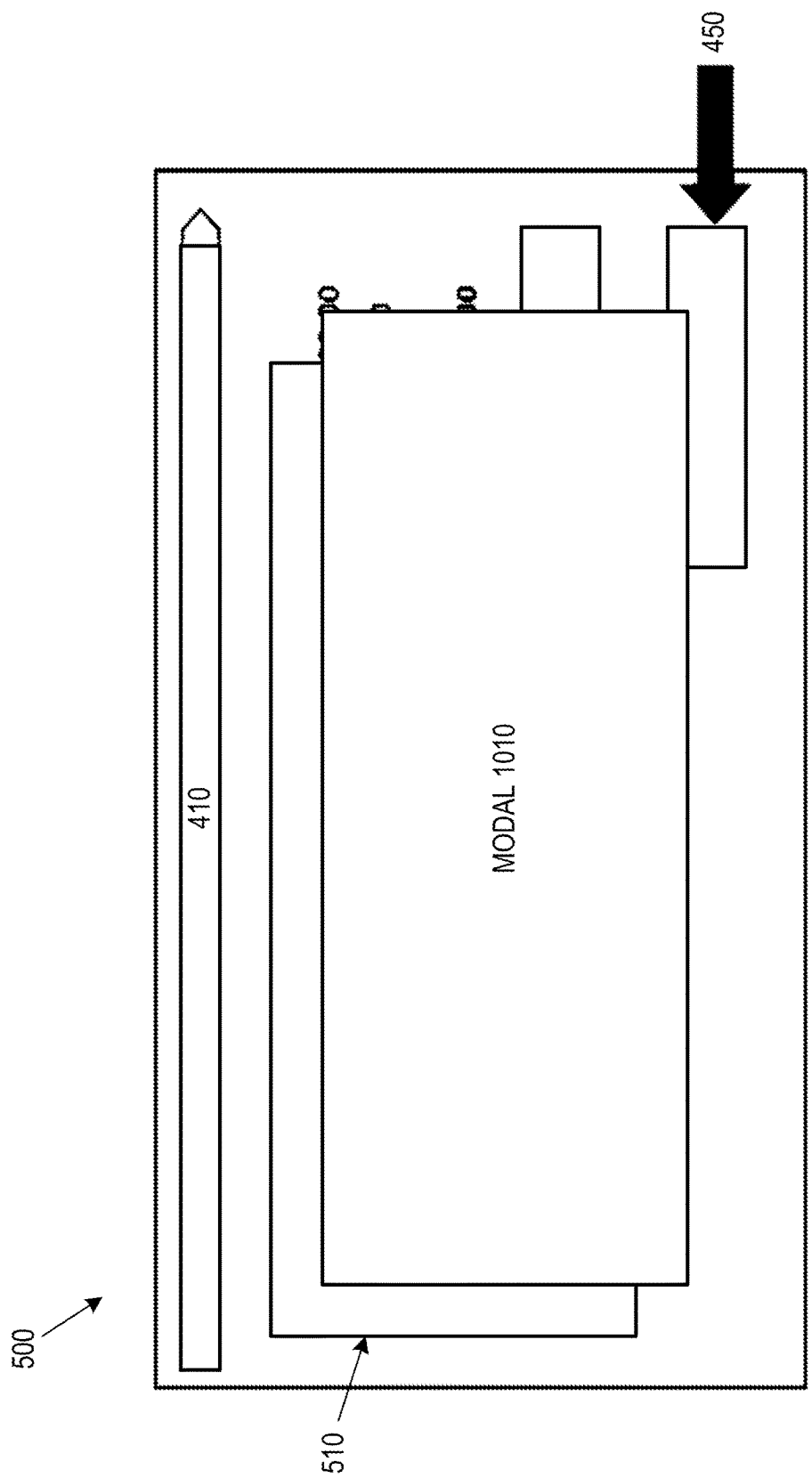
FIG. 10 depicts aspects of a system and user interfaces for data security and installment option presentation in accordance with some examples.

FIGS. 4 and 5 illustrate a user interface for a website as described above. In particular, FIG. 5 shows a user interface 500 with modal 510 overlaying user interface 400. FIG. 10 shows an additional modal that can be integrated with user interface 500 in some examples. As part of modal 510 communicating with account security system 140, the client device can engage in a secure channel with the account security system 140. After the initial modal 510 is opened as part of the secure channel, additional interface modals, such as modal 1010, can be opened for additional communications between the client device 124 and account security system 140. Such follow-on modals from the initial security modal 510 can replace the modal 510 in the user interface 500, or can be tiled to allow a user to navigate between modals 1010 and 510. In some examples, a shared set of data is accessed to allow modals 510 and 1010 to have shared design characteristics with the merchant system elements of user interface 500 (e.g. transaction flow indicator 410 and product data 420). Having shared design characteristics provides an interface for a client displayed on client device 124 to have a seamless interface for the merchant system 108 and account security system 140 portions of the merchant website displayed as user interface 500 on a client device 124.

Figure 11:
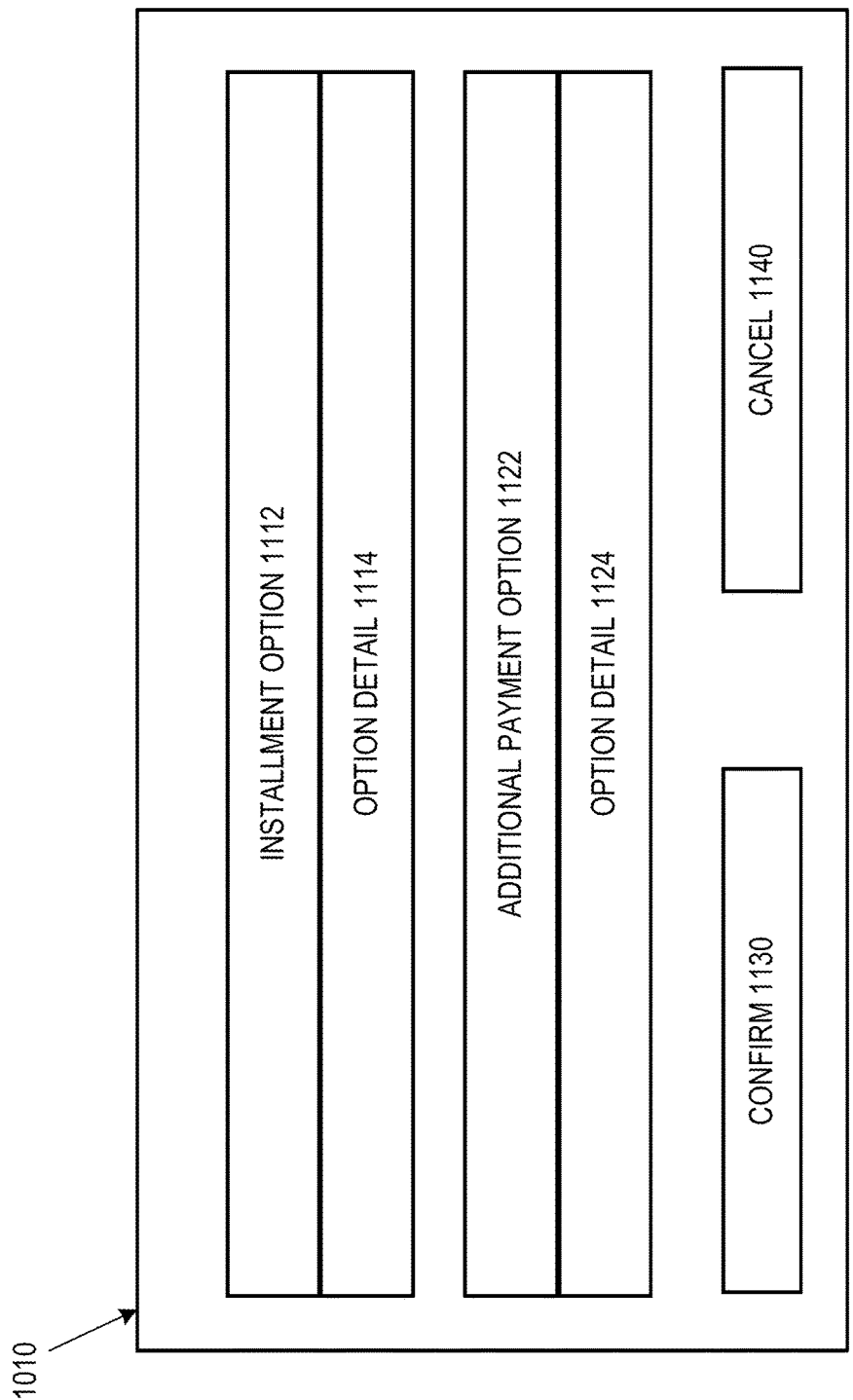
FIG. 11 depicts aspects of a system and user interfaces for data security and installment option presentation in accordance with some examples.

FIG. 11 then illustrates an example of modal 1010 for option presentation at a client device 124. As described herein, in some examples, the channel between client device 124 and account security system 140 can be used for multiple types of services, including communication of sensitive client data, account lookup services, credit offer services, promotional offer services, and installment option services associated with specific secure transactions. The modal 1010 of FIG. 7 is an example of an interface that can be displayed on a user device as part of an offer of payment options including at least one installment option 1012. The example modal 1010 includes in installment option 1112 element, an option detail 1114 element, an additional payment option 1122 element, an option detail 1124 element associated with additional payment option 1122, a confirm 1130 element, and a cancel 1140 element.

The example of FIG. 11 shows two payment options in modal 1010, but in other examples, a single option (e.g. installment option 1112) can be present to be accepted or rejected. If rejected, another modal can be presented for non-installment options. In other examples, installment and non-installment options can be presented together. In some examples, an installment option is presented in conjunction with a promotional offer (e.g. a promotional interest rate during the installment period), and can further be presented with multiple promotional options.

In some examples, the details of the payment option in a particular example (e.g. installment option 1112 or additional payment option 1122) can be accessed by an account security system 140 from a database based on input parameters received from a merchant system 108, a client device 124, or both. These input parameters can include combinations of data, including general data about the transaction from merchant system 108, and sensitive client data from client device 124. Such data can include an industry identifier associated with a product or service being purchased. Such data can also include one or more of a merchant identifier, an account number, a purchase amount, a client identifier, or any other such information. Based on the input parameters received at the account security system, the system can access available installment options based on the parameter details. For example, a particular industry identifier can be associated with a plurality of installment options, with different industry identifiers associated with different installment offers. Similarly, combinations of other information such as a purchase amount can be used to filter the available offers, or to provide additional offers. Such data can, for example, be accessed from a database. When all available options are identified, a communication with data on the available options to be displayed in modal 1010 can be generated and transmitted by account security system 140 to client device 124. When the information is received at device 124, it is displayed in a secondary security modal, such as modal 1010. An input can select any available option from the display, and confirm the selection with confirm 1130 element, or cancel 1140 element of the user interface including modal 1010 can be used to close modal 1010 and return either to another modal for communications with account security system 140, or to another interface for communications with merchant system 108.

Figure 12:
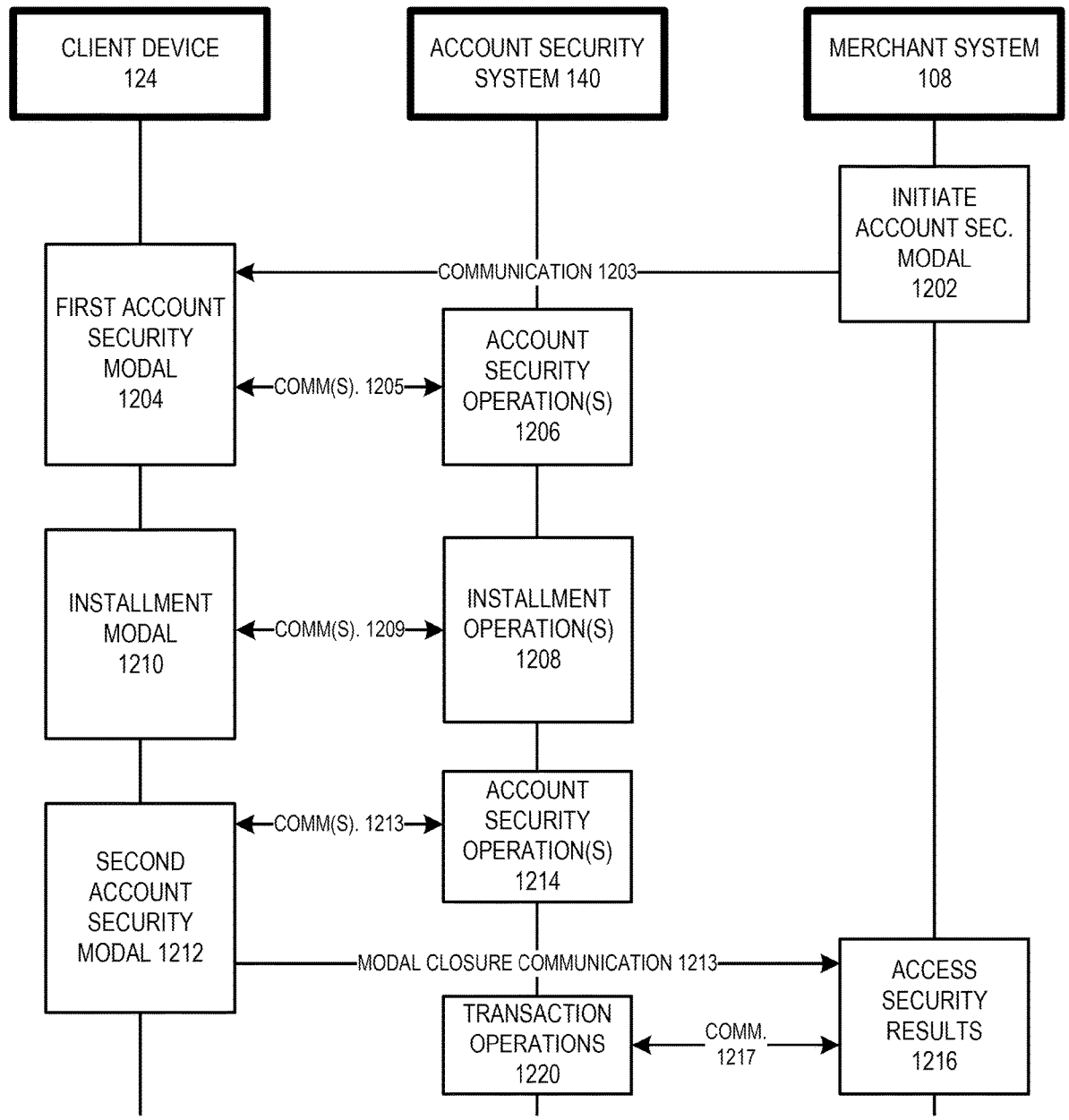
FIG. 12 depicts aspects of a system and system operations for data security and installment payment systems in accordance with some examples.

FIG. 12 describes the flow of communications for options in a modal such as modal 1110 in the context of additional operations similar to operations of FIG. 3. FIG. 12 is described using client device 124, account security system 140, and merchant system 108. In other examples, other such devices or combinations of devices can be used. Prior to operation 1202 to initiate an account security modal, authentication operations, such as operations 302 through 318 and associated communications are performed. These communications involve a secure transaction between client device 124 and merchant system 108 which is facilitated by account security system 140. After the authentication operations, merchant systems 108 initiates the account security modal in operation 1202, similar to operation 322 of FIG. 3. FIG. 12, in contrast to FIG. 3, describes additional operations by client device 124 communicating with account security system. As illustrated, the communication 1203 is used to transmit data to client device 124 to allow client device 124 to present a first account security modal in operation 1204. This first account security modal operation 1204 can be similar to some or all of the operations of the account security modal 326 of FIG. 3. In other examples, the operation 1204 can be for a modal that allows navigation to multiple options, or can be a first modal in an interface flow. Thus, in FIG. 12, multiple modals are presented for different functionality. As illustrated, an initial first modal of operation 1204 can be used for confirmation security in operations 1204 with communications 1205 and corresponding account security operations 1206 at account security system 140. This can include verifying a previous authorization, exchanging secure tokens, communicating sensitive client information, confirming account details, or other such account security operations 1206. In the example of FIG. 12, following the initial account security operations 1204 and 1206 with associated communications 1205, the account security system 140 performs installment operations 1208. These operations 1208 can include, as described above, initiating access to installment options or installment data from a database, or using local data from memory or a table in account security system 140. This information particular to client device 124 and a secure transaction with merchant system 108 can be based on details of the particular transaction, such as an industry identifier.

In some examples, as described above in the context of installment system 141, secure installment operations 1208 can involve machine learning or artificial intelligence systems to identify and select payment options (e.g. installment option 1112) for communication to secure installment modal 1210 in communications 1209. For example, account security system 140 can track and store sensitive client data, including transaction data and security data for a clients and groups of clients. By aggregating this data, the account security system 140 can identify installment options or other payment options that are expected to provide the greatest benefit to a particular client using client device 124. This information can be generated with a real-time set of data at the time of the secure transaction associated with first account security modal 1204 and secure installment modal 1210 to provide the client device 124 with a set of one or more current payment options using real-time system combined with system history data to identify and present payment options including at least one installment option on client device 124 using secure installment modal 1210.

In the various data analysis, machine learning, or artificial intelligence operations described above, the sets of payment options selected during installment operations 1208, the payment option selection by a user in operation 1210 (including the result where the selection is a cancelation), and the communications 1209 are stored and used in future decision making as part of future iterations of secure installment operations 1208. During a future instance of a secure transaction, operations 1208 will use data from previous transactions (e.g. including both transaction information from initial operations 1202-1206 as well as later details of settlement, fraud analysis, or other such data from operations 1220 or other such transaction data) and any other data to select the payment options to be sent to client device 124.

Following the client device 124 responding to the payment options, (e.g. by confirm 1130 element or cancel 1140 element), then additional options can be presented on the client device 124 in a second account security modal with operations 1212 and corresponding account security operations 1214 with communications 1213, or the modal interfaces can be closed directly. If additional operations (e.g. account access, etc.) are performed, those continue in operations 1212 and 1214 until the closure occurs. When the communication channel between client device 124 and account security system 140 ends and the final modal for this channel is closed, a modal closure communication 1213 is sent to merchant system 108. The merchant system 108 can then perform operations 1216 to check a status of the secure transaction with the account security system 140 in operations 1220. In addition to the operations 1216, the merchant system 108 can additionally perform other operations or simultaneous operations, including displaying additional products or options to a client device 124, or any other such merchant website operations that can continue following the modal closure.

Similarly, account security system 140 can not only proceed by responding to a status request in communication 1217, but can also proceed with any communications with additional systems for processing the transaction and facilitating the installment option selected in communication(s) 1209. This can include communications with a settlement system or other system associated with providing purchasing options to a customer associated with client device 124. This can additionally include further communications with client device 124 or other customer devices about payment terms, communication options related to future payment schedules, or other such information.

FIG. 13 then illustrates how the handling of installment data in a transaction network can simplify merchant system 108 integration with installment systems 141 by isolating merchant system 108 from installment data. As shown, client device 124 and merchant system 108 communicate with each other to establish and share purchase data 1310 for a secure transaction, including purchase data communication 1311. This information can be used to establish product information for transaction that can be used to identify input parameters for determining installment data 1320. The purchase data 1310 can be used at system 140 to identify the input parameters used to determine the installment data 1320, and then the installment data 1320 is shared with client device 124 using communication 1321. This installment data 1320, however, is not shared with merchant system 108, in order to simplify the integration of system 140 with merchant system 108, and to simplify the configuration and operations for enabling the installment option associated with installment data 1320. The transaction settlement with system 130 can proceed with the client and account security system 140 sharing client data 710, installment data 1320, and purchase data 1310 as needed to communicate information for payment and other settlement operations. For example, system 130 can include installment system 131 which can use installment data 1320 to facilitate the transaction, including payment to the merchant using a credit line from system 130 which is repeated according to the installment data 1320 and associated installment system operations from installment systems 131 and 141. This can include sharing of information in communication(s) 1350 between system 140 and system 130. The merchant system 108, however, does not need to be informed of the installment data 1320. Communications 1312 can thus communicate authentication data, purchase data, status requests, tokenized account data, and other such information for operations between account security system 140 and merchant system 108 without any configured structures for merchant system 108 to be involved in communication or selection of an installment option as part of a secure transaction.

FIG. 14 is a flow diagram illustrating an example method 1400. Method 1400 can be performed by one or more processors of a server computer or server system as part of an account security system (e.g. account security system 140). Method 1400 can, in some examples, be implemented as computer readable instructions that, when executed by processing circuitry of a device, cause the device to perform steps of method 1400. Method 1400 can, in some examples, be implemented in the context of methods 800 and 900 (e.g. as additional operations to integrate installment options isolated from a merchant system as part of a secure transaction between a client device and a merchant system).

Operation 1405 of method 1400 includes receiving, at an account security system including one or more processors, a checkout communication associated with a secure transaction. The checkout communication includes data describing a validated merchant system. The checkout communication can additionally include other information about the secure transaction that can be used in identifying installment data to be used in presenting payment options to a client device, and facilitating the secure transaction to completion once a client device has sent an installment communication selecting a payment option.

Operation 1410 of method 1400 includes transmitting a client token in response to an authentication that the checkout communication is from the validated checkout system. The authentication can be based on a merchant identifier and password, a key or data file, or other such authentication. The client token can then be used for future communications as part of the secure transaction. For example, when the client token is received at a client device, the client token is used to verify the merchant system for the secure transaction.

An account communication associated with the secure transaction is the received as part of operation 1415. The account communication includes the client token and client information, where the client information is not received from the merchant system. This communication, for example, allows the client token to be sent to the merchant system as part of the secure transaction, and the client token can then be sent from the merchant system to the client system, and from the client system to the account security system. When the token is received from the client system, the account security system can use the token to confirm that the client device or system is the correct device to be involved in the secure transaction.

Operation 1420 of method 1400 then involves receiving an installment payment communication associated with the secure transaction where the installment payment communication is not received from the merchant system. This installment payment communication can be part of a series of back and forth communications between an account security system and a client device, as part of a secure communication channel (e.g. using a secure modal opened on the client device. In some examples, this can involve facilitating approval of an installment authorization using the secure communication channel, receiving a find status communication from the merchant system, and verifying an approval status to the merchant system in response to the find status communication. To improve security and reduce complexity, the approval status can be communicated to the merchant system without informing the merchant system of the approval of the installment authorization, and without providing the merchant system with any installment data related to the installment at all.

Operation 1425 then involves facilitating the secure transaction following receipt of the installment payment communication. This can include communications with an issuer system or authorization and payment settlement system to confirm installment payment operations based on the user selection and approval of the purchase using the selected installment option. This can also include communications with the merchant system to facilitate completion of the purchase, and delivery of the purchase product.

As described herein, the operations of method 1400 can be implemented as real-time automatic operations, where multiple instances of operations described above can occur simultaneously. For example, a single device implementing merchant system 108 can automatically perform multiple (e.g., thousands of simultaneous) instances of each of the operations described in FIGS. 3 and 7-10 for different transactions at the same time.

Additionally, in some examples, data from one or more transactions can be analyzed and integrated as machine learning or artificial intelligence feedback into the system for selecting particular installment options for presentation as part of later transactions. In some implementations, this can involve storing transaction data for the secure transaction in a secure database, wherein the transaction data comprises installment data and one or more of a purchase amount, a merchant identifier, an industry identifier, an item category, and transaction security data. This can also involve processing the transaction data with transaction history data for a plurality of secure transactions to update a set of installment options. Some such examples further involve transmitting a set of payment options comprising at least a first installment option. As part of such an example, the installment payment communication can indicate a selection of the first installment option for the secure transaction. Also, in some such examples, the set of payment options can be generated using a set of transaction history data comprising installment data for a plurality of secure transactions, fraud data for the plurality of secure transaction, and return data for the plurality of secure transactions. The results of individual transactions including installment data can then be added to the dynamic decision algorithm (e.g., a machine learning algorithm) that determines characteristics of an installment offer (e.g., term, payment frequency, rates, changes in characteristics over time, zero rate periods, rate adjustment times, etc.) Cycles of such history feedback can result in continuous updates to the dynamic decision algorithm used to determine the installment options presented in subsequent transactions. An individual transaction can thus include both real-time feedback associated with customer data and dynamic decision making for an installment offer as part of a transaction, as well as continuous feedback for the dynamic decision making to improve future transaction results using history feedback for completed transactions.

In some examples, the various communications can involve tokenization to improve security. Some implementations can, for example, involve generating a tokenized client account number in response to the account communication transmitting the tokenized client account number. In such an implementation, the tokenized client account number allows the merchant system to process the secure transaction without access to the client information or the installment payment communication. In other implementations, other data can be tokenized.

In various implementations some or all of the operations described above can be performed in real-time or near real-time. The real-time operations can include some or all of the operations of method 1400 or any other operations described above. Such automatic operations improve a system by enabling real-time or near real-time transactions with latencies and responsiveness in automatic operations not possible when operations involve human interaction (e.g., non-automatic operation). Additionally, operations can occur simultaneously as part of a single system processing multiple transactions. Similarly, communications for other transactions can be in process while such generating operations occur as part of operations facilitated by a single device or a system that includes one or more devices configured to implement method 1400 or other operations described herein. For example, the operations described above can be performed automatically by an account security system 140 in a network, without human interaction as part of the account security system 140 operations. Similarly, merchant system 108 and client device 124 can perform certain operations automatically (e.g., without human interaction or involvement). For example, a client device 124 can receive a non-automatic input (e.g., involving a human interaction with client device 124), which initiates a chain of automatic operations at merchant system 108, account security system 140, and client device 124 without further human involvement (e.g., automatic operations flowing from an initial non-automatic operation triggered by a human input at an interface of client device 124). Such automatic operations improve a system by enabling real-time or near real-time transactions with latencies and responsiveness in automatic operations not possible when operations involve human interaction (e.g., non-automatic operation).

Figure 15:
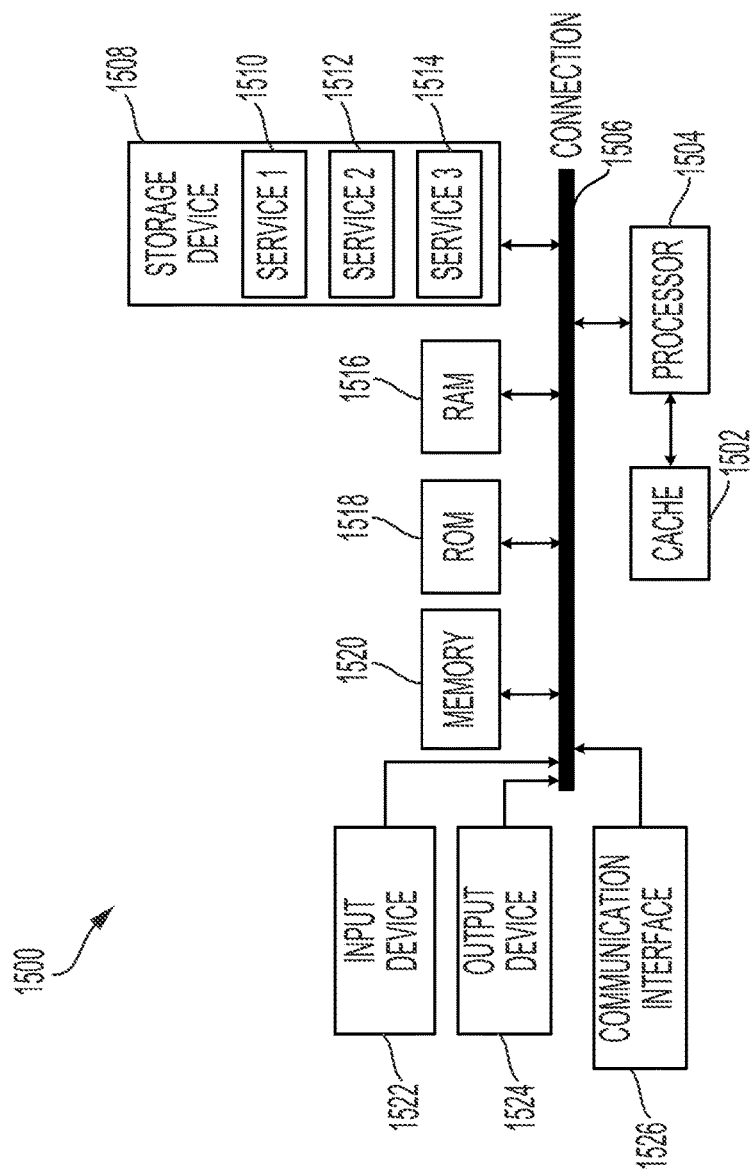
FIG. 15 shows a computing system architecture including various components in electrical communication with each other using a connection in accordance with various examples.

FIG. 15 illustrates a computing system architecture 1500 including various components in electrical communication with each other using a connection 1506, such as a bus, in accordance with some implementations. Example system architecture 1500 includes a processing unit (CPU or processor) 1504 and a system connection 1506 that couples various system components including the system memory 1520, such as ROM 1518 and RAM 1516, to the processor 1504. The system architecture 1500 can include a cache 1502 of high-speed memory connected directly with, in close proximity to, or integrated as part of the processor 1504. The system architecture 1500 can copy data from the memory 1520 and/or the storage device 1508 to the cache 1502 for quick access by the processor 1504. In this way, the cache can provide a performance boost that avoids processor 1504 delays while waiting for data. These and other modules can control or be configured to control the processor 1504 to perform various actions.

Other system memory 1520 may be available for use as well. The memory 1520 can include multiple different types of memory with different performance characteristics. The processor 1504 can include any general purpose processor and a hardware or software service, such as service 1 1510, service 2 1512, and service 3 1514 stored in storage device 1508, configured to control the processor 1504 as well as a special-purpose processor where software instructions are incorporated into the actual processor design. The processor 1504 may be a completely self-contained computing system, containing multiple cores or processors, a bus, memory controller, cache, etc. A multi-core processor may be symmetric or asymmetric.

To enable user interaction with the computing system architecture 1500, an input device 1522 can represent any number of input mechanisms, such as a microphone for speech, a touch-sensitive screen for gesture or graphical input, keyboard, mouse, motion input, speech and so forth. An output device 1524 can also be one or more of a number of output mechanisms known to those of skill in the art. In some instances, multimodal systems can enable a user to provide multiple types of input to communicate with the computing system architecture 1500. The communications interface 1526 can generally govern and manage the user input and system output. There is no restriction on operating on any particular hardware arrangement and therefore the basic features here may easily be substituted for improved hardware or firmware arrangements as they are developed.

Storage device 1508 is a non-volatile memory and can be a hard disk or other types of computer readable media which can store data that are accessible by a computer, such as magnetic cassettes, flash memory cards, solid state memory devices, digital versatile disks, cartridges, RAMs 1516, ROM 1518, and hybrids thereof.

The storage device 1508 can include services 1510, 1512, 1514 for controlling the processor 1504. Other hardware or software modules are contemplated. The storage device 1508 can be connected to the system connection 1506. In one aspect, a hardware module that performs a particular function can include the software component stored in a computer-readable medium in connection with the necessary hardware components, such as the processor 1504, connection 1506, output device 1524, and so forth, to carry out the function.

The disclosed gift selection, attribution, and distribution system can be performed using a computing system. An example computing system can include a processor (e.g., a central processing unit), memory, non-volatile memory, and an interface device. The memory may store data and/or and one or more code sets, software, scripts, etc. The components of the computer system can be coupled together via a bus or through some other known or convenient device. The processor may be configured to carry out all or part of methods described herein for example by executing code for example stored in memory. One or more of a user device or computer, a provider server or system, or a suspended database update system may include the components of the computing system or variations on such a system.

This disclosure contemplates the computer system taking any suitable physical form, including, but not limited to a Point-of-Sale system ("POS"). As example and not by way of limitation, the computer system may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, the computer system may include one or more computer systems; be unitary or distributed; span multiple locations; span multiple machines; and/or reside in a cloud, which may include one or more cloud components in one or more networks. Where appropriate, one or more computer systems may perform without substantial spatial or temporal limitation one or more steps of one or more methods described or illustrated herein. As an example and not by way of limitation, one or more computer systems may perform in real time or in batch mode one or more steps of one or more methods described or illustrated herein. One or more computer systems may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor. The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couple the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couple the processor to the network interface device. The interface can include one or more of a modem or network interface. It will be appreciated that a modem or network interface can be considered to be part of the computer system. The interface can include an analog modem, Integrated Services Digital network (ISDN0 modem, cable modem, token ring interface, satellite transmission interface (e.g., "direct PC"), or other interfaces for coupling a computer system to other computer systems. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer system can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system can be stored in the non-volatile memory and/or drive unit and can cause the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within registers and memories of the computer system into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some examples. The required structure for a variety of these systems will appear from the description below. In addition, the techniques are not described with reference to any particular programming language, and various examples may thus be implemented using a variety of programming languages.

In various implementations, the system operates as a standalone device or may be connected (e.g., networked) to other systems. In a networked deployment, the system may operate in the capacity of a server or a client system in a client-server network environment, or as a peer system in a peer-to-peer (or distributed) network environment.

The system may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any system capable of executing a set of instructions (sequential or otherwise) that specify actions to be taken by that system.

While the machine-readable medium or machine-readable storage medium is shown, by way of example, to be a single medium, the terms "computer readable medium", "computer readable storage medium", "machine-readable medium" and "machine-readable storage medium" should be taken to include a single medium or multiple media (e.g., a centralized or distributed database, and/or associated caches and servers) that store the one or more sets of instructions. The terms "computer readable medium", "computer readable storage medium", "machine-readable medium" and "machine-readable storage medium" shall also be taken to include any medium that is capable of storing, encoding, or carrying a set of instructions for execution by the system and that cause the system to perform any one or more of the methodologies or modules of disclosed herein.

In general, the routines executed to implement the implementations of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer systems, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a system, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of systems and components for a contextual connection system. It will be understood by one of ordinary skill in the art, however, that the implementations described above may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included (e.g. in FIG. 8). A process may correspond to a method, a function, a procedure, a subroutine, a subprogram, etc. When a process corresponds to a function, its termination can correspond to a return of the function to the calling function or the main function.

Client devices, network devices, and other devices can be computing systems that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback system, a printer, and/or other types of output devices. A data storage device, such as a hard drive or flash memory, can enable the computing device to temporarily or permanently store data. A network interface, such as a wireless or wired interface, can enable the computing device to communicate with a network. Examples of computing devices include desktop computers, laptop computers, server computers, hand-held computers, tablets, smart phones, personal digital assistants, digital home assistants, as well as machines and apparatuses in which a computing device has been incorporated.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A computer-implemented method, comprising:
training a dynamic decision algorithm using historical data from a plurality of secure transactions, wherein the historical data includes transaction details, records of how users pay for purchases in time periods following the purchases, and inferred customer retention data from repeat purchases;
receiving, at an account security system including one or more processors, a checkout communication associated with a new secure transaction, wherein the checkout communication includes transaction information for the new secure transaction and data describing a merchant system;
transmitting, by the account security system, a client token in response to an authentication that the checkout communication is from a validated checkout system, wherein when the client token is received at a client device, the client token is used by the client device to verify the merchant system as validated for the new secure transaction;
receiving, by the account security system, an account communication associated with the new secure transaction, the account communication including the client token and client information, wherein the client information is not received from the merchant system;
processing the checkout communication and the client information using the dynamic decision algorithm to identify a plurality of installment offers for the new secure transaction, wherein the plurality of installment offers are determined based on the transaction information and the inferred customer retention data from the historical data;
receiving an installment payment communication associated with the new secure transaction wherein the installment payment communication is not received from the merchant system;
tracking payments in time periods following the new secure transaction and subsequent transactions associated with the new secure transaction as inferred retention data of new historical data;
updating the dynamic decision algorithm using the new historical data.

2. The computer-implemented method of claim 1 further comprising establishing a secure communication channel in response to the account communication;

facilitating approval of an installment authorization using the secure communication channel;

receiving a find status communication from the merchant system; and verifying an approval status to the merchant system in response to the find status communication.

3. The computer-implemented method of claim 2, wherein the approval status is communicated to the merchant system without informing the merchant system of the approval of the installment authorization.

4. The computer-implemented method of claim 2, wherein verifying the approval status includes transmitting a one-time account number associated with the new secure transaction.

5. The computer-implemented method of claim 1 further comprising:

generating a tokenized client account number in response to the account communication; and transmitting the tokenized client account number, wherein the tokenized client account number allows the merchant system to process the new secure transaction without access to the client information or the installment payment communication.

6. The computer-implemented method of claim 1 further comprising:

storing transaction data for the new secure transaction in a secure database, wherein the transaction data includes installment data and one or more of a purchase amount, a merchant identifier, an industry identifier, an item category, and transaction security data; and processing the transaction data with transaction history data for the plurality of secure transactions to update a set of installment options.

7. The computer-implemented method of claim 1 further comprising transmitting a set of payment options including at least a first installment option;

wherein the installment payment communication indicates a selection of the first installment option for the new secure transaction; and wherein the set of payment options is generated using a set of transaction history data including installment data for the plurality of secure transactions, fraud data for the plurality of secure transactions, and return data for the plurality of secure transactions.

8. An account security system, comprising:

memory; and one or more processors coupled to the memory and configured to perform operations comprising:

training a dynamic decision algorithm using historical data from a plurality of secure transactions, wherein the historical data includes transaction details, records of how users pay for purchases in time periods following the purchases, and inferred customer retention data from repeat purchases;

receiving, at the account security system, a checkout communication associated with a new secure transaction, wherein the checkout communication includes transaction information for the new secure transaction and data describing a merchant system;

transmitting, by the account security system, a client token in response to an authentication that the checkout communication is from a validated checkout system, wherein when the client token is received at a client device, the client token is used by the client device to verify the merchant system as validated for the new secure transaction;

receiving, by the account security system, an account communication associated with the new secure transaction, the account communication including the client token and client information, wherein the client information is not received from the merchant system;

processing the checkout communication and the client information using the dynamic decision algorithm to identify a plurality of installment offers for the new secure transaction, wherein the plurality of installment offers are determined based on the transaction information and the inferred customer retention data from the historical data;

receiving an installment payment communication associated with the new secure transaction wherein the installment payment communication is not received from the merchant system;

tracking payments in time periods following the new secure transaction and subsequent transactions associated with the new secure transaction as inferred retention data of new historical data;

updating the dynamic decision algorithm using the new historical data.

9. The device of claim 8, wherein the one or more processors are further configured to perform operations comprising:

establishing a secure communication channel in response to the account communication;

facilitating approval of an installment authorization using the secure communication channel;

receiving a find status communication from the merchant system; and verifying an approval status to the merchant system in response to the find status communication.

10. The device of claim 9, wherein the approval status is communicated to the merchant system without informing the merchant system of the approval of the installment authorization.

11. The device of claim 9, wherein verifying the approval status includes transmitting a one-time account number associated with the new secure transaction.

12. The device of claim 8, wherein the one or more processors are further configured to perform operations comprising:

generating a tokenized client account number in response to the account communication; and transmitting the tokenized client account number, wherein the tokenized client account number allows the merchant system to process the new secure transaction without access to the client information or the installment payment communication.

13. The device of claim 8, wherein the one or more processors are further configured to perform operations comprising:

storing transaction data for the secure new transaction in a secure database, wherein the transaction data includes installment data and one or more of a purchase amount, a merchant identifier, an industry identifier, an item category, and transaction security data; and processing the transaction data with transaction history data for the plurality of secure transactions to update a set of installment options.

14. The device of claim 8, wherein the one or more processors are further configured to perform operations comprising:

transmitting a set of payment options including at least a first installment option;

wherein the installment payment communication indicates a selection of the first installment option for the new secure transaction; and wherein the set of payment options is generated using a set of transaction history data including installment data for the plurality of secure transactions, fraud data for the plurality of secure transactions, and return data for the plurality of secure transactions.

15. A non-transitory computer readable medium comprising instructions that, when executed by one or more processors of an account security system, cause the account security system to perform operations comprising:

training a dynamic decision algorithm using historical data from a plurality of secure transactions, wherein the historical data includes transaction details, records of how users pay for purchases in time periods following the purchases, and inferred customer retention data from repeat purchases;

receiving, at an account security system including one or more processors, a checkout communication associated with a new secure transaction, wherein the checkout communication includes transaction information for the new secure transaction and data describing a merchant system;

transmitting, by the account security system, a client token in response to an authentication that the checkout communication is from a validated checkout system, wherein when the client token is received at a client device, the client token is used by the client device to verify the merchant system as validated for the new secure transaction;

receiving, by the account security system, an account communication associated with the new secure transaction, the account communication including the client token and client information, wherein the client information is not received from the merchant system;

processing the checkout communication and the client information using the dynamic decision algorithm to identify a plurality of installment offers for the new secure transaction, wherein the plurality of installment offers are determined based on the transaction information and the inferred customer retention data from the historical data;

receiving an installment payment communication associated with the new secure transaction wherein the installment payment communication is not received from the merchant system;

tracking payments in time periods following the new secure transaction and subsequent transactions associated with the new secure transaction as inferred retention data of new historical data;

updating the dynamic decision algorithm using the new historical data.

16. The non-transitory computer readable medium of claim 15, wherein the instructions further configure the one or more processors to perform operations comprising:

establishing a secure communication channel in response to the account communication;

facilitating approval of an installment authorization using the secure communication channel;

receiving a find status communication from the merchant system; and verifying an approval status to the merchant system in response to the find status communication.

17. The non-transitory computer readable medium of claim 16, wherein the approval status is communicated to the merchant system without informing the merchant system of the approval of the installment authorization.

18. The non-transitory computer readable medium of claim 16, wherein verifying the approval status includes transmitting a one-time account number associated with the new secure transaction.

19. The non-transitory computer readable medium of claim 15, wherein the instructions further configure the one or more processors to perform operations comprising:

generating a tokenized client account number in response to the account communication; and transmitting the tokenized client account number, wherein the tokenized client account number allows the merchant system to process the new secure transaction without access to the client information or the installment payment communication.

20. The non-transitory computer readable medium of claim 15, wherein the instructions further configure the one or more processors to perform operations comprising:

storing transaction data for the new secure transaction in a secure database, wherein the transaction data includes installment data and one or more of a purchase amount, a merchant identifier, an industry identifier, an item category, and transaction security data; and processing the transaction data with transaction history data for a plurality of secure transactions to update a set of installment options.

21. The non-transitory computer readable medium of claim 15, wherein the instructions further configure the one or more processors to perform operations comprising:

transmitting a set of payment options including at least a first installment option;

wherein the installment payment communication indicates a selection of the first installment option for the new secure transaction; and wherein the set of payment options is generated using a set of transaction history data including installment data for the plurality of secure transactions, fraud data for the plurality of secure transactions, and return data for the plurality of secure transactions.

\* \* \* \* \*